(12) United States Patent
Powell

(10) Patent No.: US 7,791,810 B2
(45) Date of Patent: Sep. 7, 2010

(54) SCANNED BEAM DISPLAY HAVING HIGH UNIFORMITY AND DIMINISHED COHERENT ARTIFACTS

(75) Inventor: Karlton D. Powell, Lake Stevens, WA (US)

(73) Assignee: Microvision, Inc., Redmond, WA (US)

( * ) Notice: Subject to any disclaimer, the term of this patent is extended or adjusted under 35 U.S.C. 154(b) by 440 days.

(21) Appl. No.: 11/963,091

(22) Filed: Dec. 21, 2007

(65) Prior Publication Data
US 2009/0161191 A1    Jun. 25, 2009

(51) Int. Cl.
*G02B 27/14* (2006.01)
(52) U.S. Cl. .................. 359/632; 359/199.1
(58) Field of Classification Search .......... 359/13–14, 359/630, 632, 196.1–226.3
See application file for complete search history.

(56) References Cited

U.S. PATENT DOCUMENTS 7,589,900 B1 * 9/2009 Powell .................. 359/626

\* cited by examiner

*Primary Examiner*—Alessandro Amari
*Assistant Examiner*—Jennifer L. Doak
(74) *Attorney, Agent, or Firm*—Kevin D. Wills

(57) ABSTRACT

Briefly, in accordance with one or more embodiments, time averaged Moiré patterns may be utilized in a scanned beam display having a Gaussian beam profile or the like in order to tailor uniformity of the image by controlling both the near field and far field regions of the display to result in a stable and uniform scanned beam display image. Consideration is made regarding the light source parameters of focus numerical aperture, profile, shape, and/or wavelength to achieve higher uniformity and stability without resulting in significant visible coherent artifacts such as tiled intensity patterns and/or Moiré.

13 Claims, 19 Drawing Sheets

UNIFORMITY SEEN BY 3mm EYE PUPIL

SCANNED BEAM DISPLAY HAVING HIGH UNIFORMITY AND DIMINISHED COHERENT ARTIFACTS

BACKGROUND

Scanned beam head-up displays (HUDs) and other scanned beam displays which can include direct view panel displays that allow the viewer's eye to move freely within a defined volume known as the viewing eyebox have a higher requirement for uniformity than head mounted displays (HMDs), especially color uniformity. In some display systems equipped with an exit pupil expander (EPE), it is possible for the eye to be placed in locations such that the beamlet patterns emanating from various EPE field points by the beam interacting with the periodic array of the EPE may not overlap. In such instances, the appearance to the eye is that there is a magnified portion of the beamlet pattern illuminated across the full field of view (FOV), where the amount of apparent magnification depends on distance of eye away from the ideal viewing plane, where all of these beamlet patterns do cross or overlap, and beamlet density which can be defined in terms of angular resolution. When viewing at the ideal plane, the magnification of the backlit pattern is apparently infinite, and a specific intensity level appears across the full FOV, thus no tiling patterns appear to be backlit across the field of view. The intensity level of the full FOV may change according to the beamlet pattern uniformity convolved with eye-pupil size, when the eye moves in an x-y direction.

The typical solution to this problem has been to tile beamlet profiles in the eyebox such that the uniformity is flattened within the eyebox beamlet pattern. To accomplish this, a top hat converter lens may be utilized to obtain a flat top intensity profile from a Gaussian beam laser source. The top hat output then may be clipped to the proper shape to complement the periodic EPE array pitch and layout. When using the proper focusing numerical aperture (NA), the result is that the input beam solid cone will have the same angular content to fully fill the solid angle between diffraction orders of the beamlet pattern, thus achieving a Fill Factor of 1. For a typical scanned beam system, use of any Fill Factor greater than 1 results in a condition that induces Moiré across the FOV wherein sub-cell illumination by an undersized spot does not fully fill all exit angles into the eyebox, and aliasing effects between the raster line spacing and EPE pitch result in a Moiré effect. Resulting uniformity can be satisfactory if all beamlet controls have been properly designed such as beamlet profile, Fill Factor, and/or shape used in conjunction with an EPE capable of forming a uniform exit pattern or diffraction envelope. However, this approach entails tedious alignments and elements such as circularizers, top hat converter lenses, and/or hex apertures with clocking requirements, as well as the expected relationships between spot character and EPE pitch and layout. Further, the use of a focused top hat forms a sinc-like spot that causes loss of contrast in the mid-spatial frequencies of the display due to a ramp-like modulation transfer function (MTF) response.

As a result, light sources for EPE equipped scanned beam systems specifying a uniform eyebox volume have been designed specifically to form cone NAs limited within the solid cone representing a Fill Factor of 1 in order to achieve sufficient uniformity within the eyebox volume while at the same time avoiding Moirés, which manifests itself by apparent fringes within the FOV. Attempts have been made in the past hoping to capitalize on use of Gaussian beamlet profiles by overlapping the Gaussian beamlets near full-width half-maximum (FWHM), however such attempts have always resulted in a condition of sub-cell illumination such that the spot did not fully fill the lenslet or diffractive optical element (DOE) cell. Under such a condition, the exit pupil pattern at the eyebox changes in profile producing hot spots in intensity that depend on the x-y position of the undersized spot within the lenslet or cell. Since neighboring beamlets have differing phase, constructive and destructive interference occurs such that the skirts of the Gaussian either form constructive peaks or extinctions. The dependence of such chances on spot position implies that the eye will see different intensities emanating from different pixel locations due to aliasing between the EPE pitch and the raster line spacing.

When the NA is set such that the spot is equal to or larger than the EPE pitch, and/or cell size, spot location dependency of the eyebox diffraction envelope pattern can be avoided, thus Moiré can be avoided. However when the NA is set such that the spot is larger than a cell, gapping forms between beamlets within the eyebox, and although the diffraction envelope is solid, uniformity within the eyebox suffers, thereby causing apparent tiling artifacts.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

Figure 1:
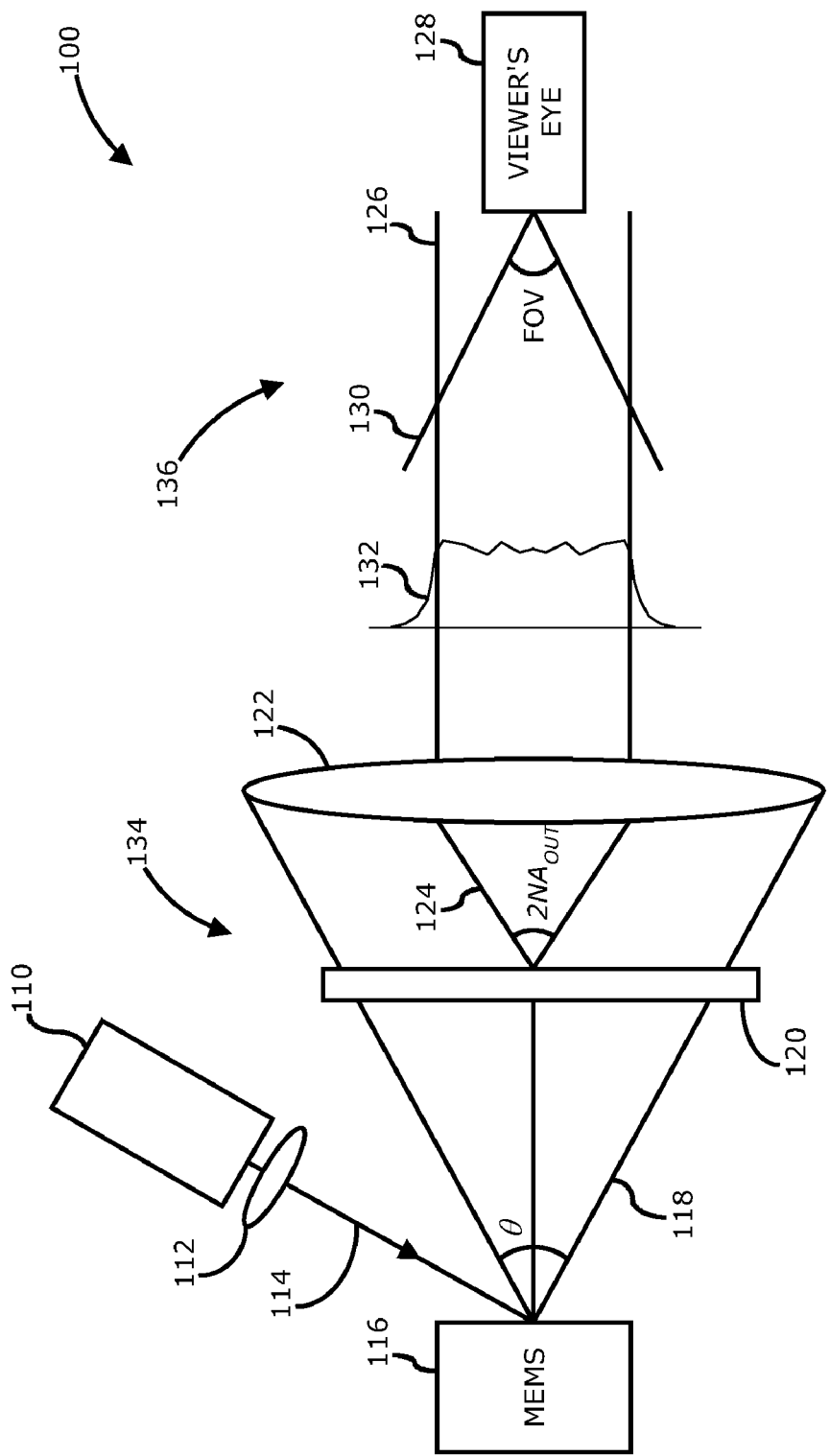
FIG. 1 is a diagram of a scanned beam display in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. However, "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Referring now to FIG. 1, a diagram of a scanned beam display in accordance with one or more embodiments will be discussed. As shown in FIG. 1, a typical scanned beam display 100 may comprise a laser source 110 capable of emitting a laser beam 114 to be scanned into a displayed image by a MEMS based scanner 116. Laser source 110 may comprise, for example, a vertical-cavity surface-emitting laser (VCSEL) or the like. MEMS scanner 116 may comprise one or more mirrors disposed on a platform capable of moving in response to an applied voltage to reflect laser beam 148 into a predetermined raster scan 118. In one or more embodiments, scanned beam display 100 may further include beam shaping optics 112 to shape the laser beam 114 emitted by laser source 110. For example, the shape of the laser beam 114 emitted from laser source 110 may be generally elliptical in shape, and beam shaping optics 112 may comprise a circularizer for causing the beam profile 112 to be generally circular in shape after being circularized by beam shaping optics 112. Likewise, beam shaping optics 112 may comprise a top hat lens to cause the profile of the beam, emitted by laser source 110 to be generally flattened in shape from a natural Gaussian type profile as emitted from a typical laser source 110 although the scope of the claimed subject matter is not limited in this respect. Further details of the beamlet profile are shown in and described with respect to FIG. 2, below. In one or more embodiments, other various beam profiles may be utilized, for example an apodized sinc function and/or other arbitrary beam profiles as long as the appropriate size and clipping aperture are determined for best uniformity across 126 eyebox, while maintaining minimized raster ripple. In such cases there may be optimized tradeoffs for any such beam profiles based at least in part on analysis of a contrast chart such as shown for example in FIG. 5, below. Although a Gaussian beam profile may provide system simplicity, using an apodized sinc may enhance the MTF of a scanned beam display 100, although the scope of the claimed subject matter is not limited in this respect.

In one or more embodiments, the laser beam 114 is reflected by MEMS scanner 116 to generate a raster scan 118 projected onto an exit pupil expander 120. The maximum total beam deflection angle capable of being produced by MEMS scanner 116 may be referred to as θ. Where MEMS scanner 116 has a scan mirror size of D, which may also refer to the clipping aperture, for a given image size of L, the relationship of THETA θ to the input numerical aperture $NA_{IN}$ at MEMS scanner 116 may be givens as:

$$2LNA_{IN}=D\theta$$

In one or more embodiments, exit pupil expander 120 may comprise an array of lenses, for example a microlens array (MLA). In one embodiment, the array may comprise any element or cell having an particular transfer function, and is not limited to a microlens array. Likewise, EPE 120 may comprise a dual MLA formed by two adjacent MLAs. In one or more embodiments, the array may comprise a periodic array of elements or cells, and in one or more alternative embodiments the array may comprise multiple elements that monotonically increase or decrease in spacing across the array, and or otherwise smoothly vary in spacing across the array, along any dimension of the array, and the scope of the claimed subject matter is not limited in this respect. When the reflected beam raster 118 is scanned across exit pupil expander 120, the image to be displayed from exit pupil expander 120 is relayed by the projection optics 122 to form a viewing eyebox, or exit pupil, such that the image to be displayed appears at a distance, typically 2-3 meters for a HUD, away from the location of the viewer's eye 128. In some embodiments, exit pupil expander 120 and/or projection optics 122 may be located at or near the vicinity of MEMS scanner 116, such as where scanned beam display 100 comprises a head-up display in a vehicle or the like, for example where the image is reflected off the windshield of the vehicle and back to the viewer's eye 128. In some particular embodiments, exit pupil expander 120 may be disposed in, on, or near the windshield. In one or more alternative embodiments, one or more of exit pupil expander 120 and/or projection optics 122 may be disposed near the viewer's eye 128, for example where projection optics 122 comprises an ocular at or near the viewer's eye, such as suspended by a head band worn by the viewer, and/or disposed in a visor of a head band or helmet worn by the viewer. However, these are merely example arrangements of exit pupil expander 120 and projection optics 122, and the scope of the claimed subject matter is not limited in these respects.

Exit pupil expander 120 is capable of expanding, or converting, the numerical aperture (NA) from the numerical aperture input at MEMS scanner 116. In such embodiments, exit pupil expander 120 may provide NA conversion at an intermediate image plane to achieve a larger exit pupil. As shown in FIG. 1, the full exit cone angle due to the expanded NA output 124 of exit pupil expander can be represented by approximately twice the output NA ($2NA_{OUT}$). The size, L, of the image at exit pupil expander 120 is equal to the product of image resolution and pixel size. The expanded NA output 124 is relayed by projection optics 122 to result in an eyebox 126 in which the projected image is capable of being viewed by the viewer's eye 128, so that the projected image is generally viewable when the viewer's eye 128 is located within eyebox 126, and is generally not viewable when the viewer's eye 128 is located outside of eyebox 126. While the viewer's eye 128 is located within the eyebox 126, the viewer is capable of viewing the image in a field of view (FOV) 130 defined by, among other things, the projection optics 122. The relationship between the output numerical aperture, exit pupil diameter (EP) and the field of view is defined as:

$$LNA_{OUT}=EP\sin(FOV/2)$$

The image is generally viewed by the viewer as a planar image based on a diffraction pattern 132 of beamlets generated by raster scan 118 on exit pupil expander 120. The resulting diffraction pattern 132 may be based at least in part on the characteristics the beam profile of laser beam 114, the scanning capabilities and addressability of MEMS scanner 116, the characteristics of exit pupil expander 120 and the relationships between exit pupil expander 120 and raster scan 118 impinging on the lenses of exit pupil expander 120, for example beam spot size, Fill Factor, and so on, although the scope of the claimed subject matter is not limited in these respects. In one or more embodiments, scanned beam display 100 may be configured to operate where the beam profile of laser beam 114 is generally Gaussian in shape, which may be a natural beam profile of the laser beam 114 generated by laser source 110. In such a configuration, beam shaping optics 112 may not require a top hat lens to shape the beam profile of the emitted laser beam 114. Various beam profiles are shown in and described with respect to FIG. 2, below. In one or more embodiments, a near field 134 of scanned beam display 100 may be defined as the optical pathway in the region comprising MEMS scanner 116, exit pupil expander 120, and/or projection optics 122, and a far field 136 may be defined as a region defined by eyebox 126 and field of view 130, although the scope of the claimed subject matter is not limited in this respect.

In one or more embodiments, a periodic EPE 120 may be utilized in scanned beam display 100 to result in constant beamlet spacing, however the transmission function of a given lens cell, or lenslet, of EPE 120 determines the resulting diffraction envelope 132 due to the cell and thus the level of beamlet-to-beamlet uniformity. Note that diffraction pattern and diffraction envelope have been used interchangeably herein. In some instances, the diffraction envelope may result from a single cell transmission function, while the interference of overlapping diffraction envelopes coming from neighboring cells gives rise to interferences, thus forming the diffraction orders, or beamlets. For diffraction patterns containing many beamlets, the diffraction envelope can be approximately visualized by drawing an envelope through the peaks of all beamlets. Where scanned beam display 100 is designed to allow the viewer's head to move freely within the eyebox 126, the relationship between the input beam profile and shape characteristics and the transmission function of EPE 120 is taken into account in order to achieve a display without significant visible coherent artifacts. A periodic EPE 120 may be utilized in scanned beam display 100 to achieve such a higher level of beamlet-to-beamlet uniformity. While a periodic EPE 120 array is capable of eliminating random speckle artifacts, periodic beamlet diffraction pattern 132 at the eyebox 126 as a result of ordered interference still may be subject to coherent artifacts such as intensity gaps between beamlets and/or beamlet intensity overlap. For head-free type scanned beam display 100, these coherent artifacts may result in two undesirable visual effects: an intensity tiling pattern, or simply tiling, that appears across the FOV 130, but is not mapped to the FOV 130, and a Moiré pattern that appears across the FOV 130, caused by aliasing between the pitch of EPE 120 and the line spacing of raster scan 118. An example of a Moiré pattern artifact is shown in and described with respect to FIG. 8, below, and an example of a tiling pattern artifact is shown in and described with respect to FIG. 9, below.

In one or more embodiments, once scanned beam display is configured to achieve beamlet-to-beamlet uniformity, beam controls, may be utilized to reduce and/or limit these coherent artifacts of tiling and/or Moiré to achieve a high level of display uniformity and image stability. Such beam controls may involve constraints on the beam parameters and may be summarized as follows: beam shape at the system clipping aperture, beam profile across the system clipping aperture, and/or beam focus NA. In one or more embodiments, the pitch of the elements EPE 120 (EPE pitch), and/or beam wavelength may also be taken into consideration when determining the quantities of these parameters. For instance, exit pupil pattern uniformity may be consistent and independent of spot position for spot sizes larger than the EPE pitch, but may be dependent on spot position for spot sizes smaller than the EPE pitch, or cell size. Moiré can occur for the latter case since exit pupil uniformity from a given spot location, or from a given field point within the image, emanates a different intensity toward the viewer's eye depending on the spot location within the illuminated cell in EPE 120. As it typically may be undesirable to require registration of the raster with the EPE 120 due to raster trajectory artifacts, such as raster pinch, aliasing between the pitch layout of EPE 120 and/or the line spacing of raster scan 118 may introduce a Moiré intensity pattern across FOV 130. Where the spot size of beam 114 is larger than the cell size of EPE 120, the overall diffraction envelope 132 of the exit pupil pattern is relatively stable versus spot position at the plane of EPE 120, but intensity gaps may form between beamlets within the exit pupil pattern as the spot grows beyond the cell size. A larger spot size can illuminate more neighboring cells in EPE 120, thereby increasing the number of exposed equally spaced scatter centers, each of which may be approximately collimated by projection optics 122 at very slightly different, but equally spaced angles toward the viewer's eye 128. In an extreme case the result may be considered similar to the N−1 extinctions formed across the interference region of N-equally-spaced beams, forming gaps in the areas exhibiting destructive interference. Consequently, for the case where the spot size of laser beam 114 is larger than the cell size of EPE 120, each resulting beamlet NA is on the order of the input beam NA.

In one or more embodiments, a fill factor of F=1 represents a spot formed by an NA that contains energy out to an angle that matches the NA subtended by a single diffraction order spacing, and thus the spacing of a single beamlet within the exit pupil. Although fill factor is independent of beam profile of laser beam 114, a typical spot size for the case of F=1 would be on the order of the cell size of EPE 120. Where intensity gapping occurs, a visible intensity tiling pattern, which is a coherent artifact, appears across FOV 130 that is not mapped to FOV 130 in angle, and so the tiling pattern appears to move in the background of the image upon movement of the viewer's head. The tiling pattern is formed by intensity variation across beamlets within the exit pupil, and which may appear to be somewhat smoothed to the viewer's eye 128 due to integration by the eye pupil, which comprises a convolution of the beamlet pattern with eye pupil size. As more beamlets are captured through an eye pupil, uniformity of the image can appear improved. However this may imply that for a given beamlet density uniformity may improve when the brightness is reduced so as to allow the eye pupil to increase in size. Increasing beamlet density at the exit pupil can be achieved by using lower angular resolution. However such a design of scanned beam display 100 may not be acceptable for higher angular resolution specification of scanned beam display 100. Thus, in one or more embodiments EPE pitch may be selected based at least in part on a desired resolution. Where scanned beam display system 100 is designed to have a higher angular resolution, laser beam 114 may be tailored using beam controls to achieve higher uniformity with reduced coherent artifacts. Such beam controls may include, for example, providing a suitable beam profile for laser beam 114 as discussed with respect to FIG. 2, below.

Figure 2:
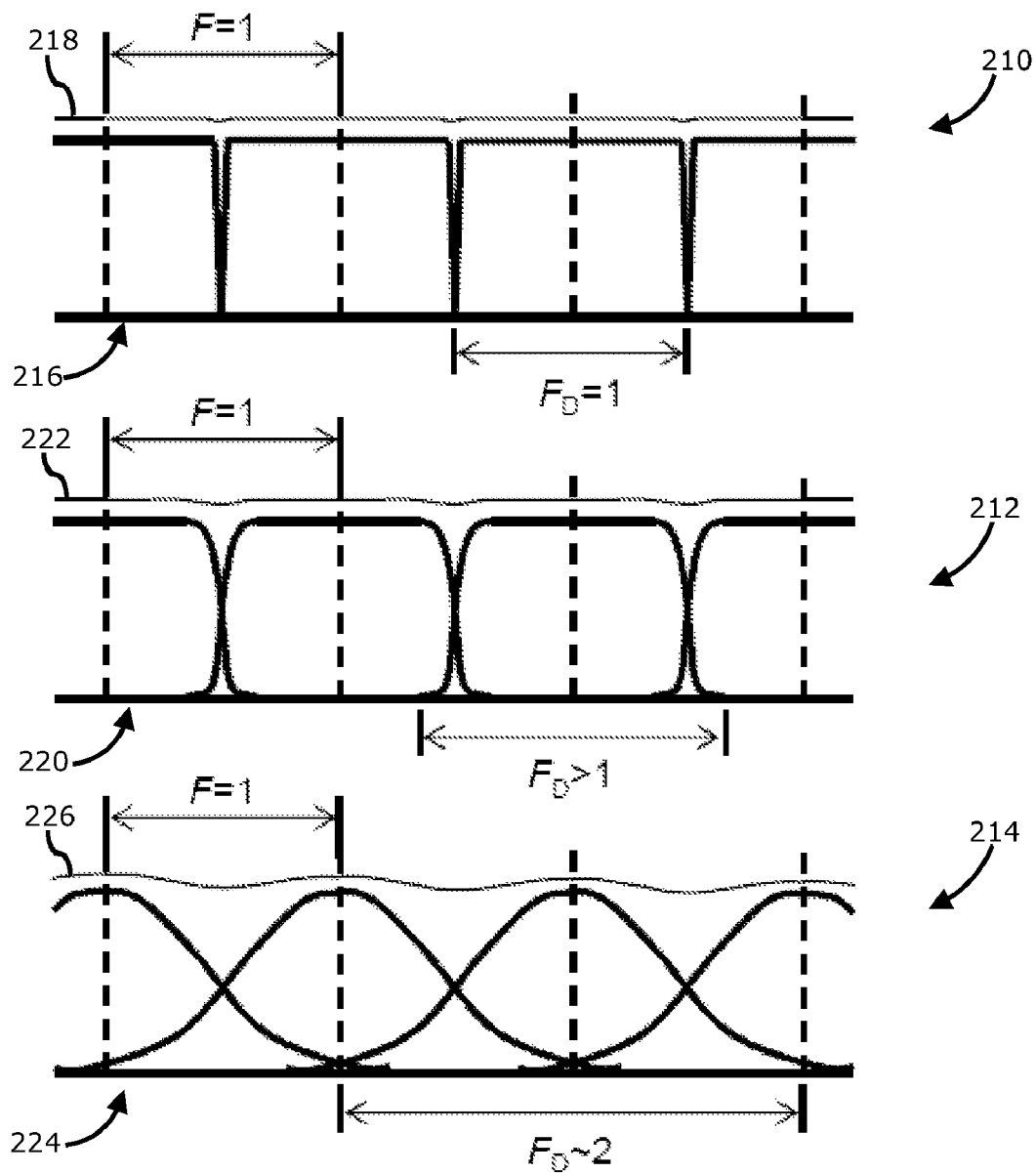
FIG. 2 is a diagram illustrating various beam profiles for a scanned beam display in accordance with one or more embodiments.

Referring now to FIG. 2, a diagram illustrating various beam profiles for a scanned beam display in accordance with one or more embodiments will be discussed. In one or more embodiments, the beam profile may be selected to minimize any tiling artifacts in the displayed image. As shown in FIG. 2, the beam profile of laser beam 114 may be selected to have a profile based at least in part on the selected design parameters of scanned beam display 100. In general, beam shaping optics 112 may include a top hat lens resulting in a top hat beam profile 210 comprising a family of beamlets 216 to achieve high uniformity 218 across beamlets 216 spaced within eyebox 126 due to the beam interacting with given pitch of lens elements of exit pupil expander 120. A rounded top hat profile 212 is shown comprising a family of rounded top hat shaped beamlets 220 to achieve a high uniformity 222 across beamlets 220. Such rounded top hat profile 212 may be achieved mathematically be a Fermi-Dirac function or the like. Likewise, a Gaussian profile 214 is shown comprising Gaussian function shaped beamlets 224 to achieve a high uniformity 226 across beamlets 224. Top hat profile 210 may use the smallest mirror size for MEMS scanner 116 with a footprint representing a Fill factor of $F_D=1$, whereas if a Gaussian profile 214 is utilized, a fill factor of $F_D\sim 2$ may be utilized. In general, a top hat type profile 210 may be ideal and may utilize the smallest, or nearly the smallest, Fill factor to achieve equal energy spread, and thus the top hat profile 210 may have the least $\theta D$ requirement for MEMS scanner 116. However, to achieve top hat profile 210, beam shaping optics 112 may be required to achieve a higher efficiency. In such a case, the diffraction envelope 132 may not be significantly dependent on spot position of laser beam 114. Any arbitrary beamlet profile which can be sized so as to achieve an acceptable level of equal spread of energy over the eyebox 126 may be utilized, taking into account the beamlet spacing within the cross-section. In one or more embodiments, to reduce or avoid Moiré artifacts, the raster linespacing in the near field 134 at EPE 120 may be selected relative to spot size to have sufficient addressability to exhibit a reduced or minimized raster ripple of raster scan 118. Utilization of a Gaussian profile 214 may require a Fill factor of near F=2, and thereby may also have a higher $\theta D$ requirement for MEMS scanner 116. However, most laser sources 110 exhibit Gaussian exit NA profile, thereby allowing for simpler beam shaping optics 112, for example so that a top hat converter lens may not be required, although the scope of the claimed subject matter is not limited in these respects. For the Gaussian case having Fill factor near F=2, since a large portion of the Gaussian energy will be passed through the limiting aperture due to low clipping, or truncation ratio near T=0.85, higher efficiencies can be achieved using these simpler beam shaping optics, as discussed further, below.

As shown in FIG. 2, by using a Gaussian-to-top hat converter lens via a beam shaping optics 112, laser 110 may comprise Gaussian source to achieve uniformity across the exit pupil. A top hat intensity profile across the system clipping aperture can be sized to force beamlets in the Exit Pupil to be tiled, as a mosaic pattern, when the Fill factor is set to F=1. However, for head-free systems, the integrity of top hat intensity profile 210 has a limited range within the eyebox 126, since it is partially transforming toward a sinc function as the viewer's eye 128 moves away from the ideal transform plane within the eyebox 126. Any significant errors in tiling the beamlets may result in visible intensity tiling artifacts mapped across FOV 130. Although rounded top hat profiles 212 or Gaussian profiles 214 are capable of reducing the abruptness of the tiling artifact, arbitrary use of such profiles in a given system with given angular addressability in the raster scan 118 can result in a visible Moiré pattern. The Moiré pattern emerges from intensity variations, or waviness across the eyebox 126, that do not have consistent location within the exit pupil for each pixel. This waviness in intensity is induced by the aliasing between the EPE pitch and line spacing of raster scan 118. In addition, the skirts of such beam profiles may extend beyond a Fill factor of F=1, allowing spot-position-dependent beamlet patterns due to construction and/or destructive interference as the relative phase of neighboring beamlets varies. In general, it appears that Moiré patterns may occur if the Fill factor is set greater than F=1.

In one or more embodiments, by carefully minding uniformity in both the near field 134 at EPE 120, and in the far field 136 at the exit pupil in eyebox 126 of scanned beam display 100, sufficient uniformity may be achieved substantially free of coherent artifacts such as tiling patterns and/or Moiré. Thus, FIG. 2 illustrates a family of profiles 210, 212, and/or 214, or the like, that may be utilized to achieve higher performance by setting the Fill factor for optimum uniformity across eyebox 126, while also setting the line spacing of raster scan 118 for optimum uniformity in the near field 134 such that a cell of EPE 120 may be illuminated evenly over the time of a scan. Due to achieved efficiency and/or the simplicity of not requiring beam shaping at beam shaping optics 112, a Gaussian beam profile 214 may be utilized. By allowing a Gaussian profile 214 to extend beyond F=1 can induce a Moiré condition, but constraining the beam NA below F=1 causes tiling artifacts due to intensity gapping. In one or more embodiments, a Gaussian profile 214 having a Fill factor greater than F=1 may be utilized, and level of contrast of the resulting Moiré pattern can be reduced or diminished beyond the appearance to the viewer's eye 128 by forming multiple complimentary Moiré patterns over the time of a single raster scan 118.

Figure 3:
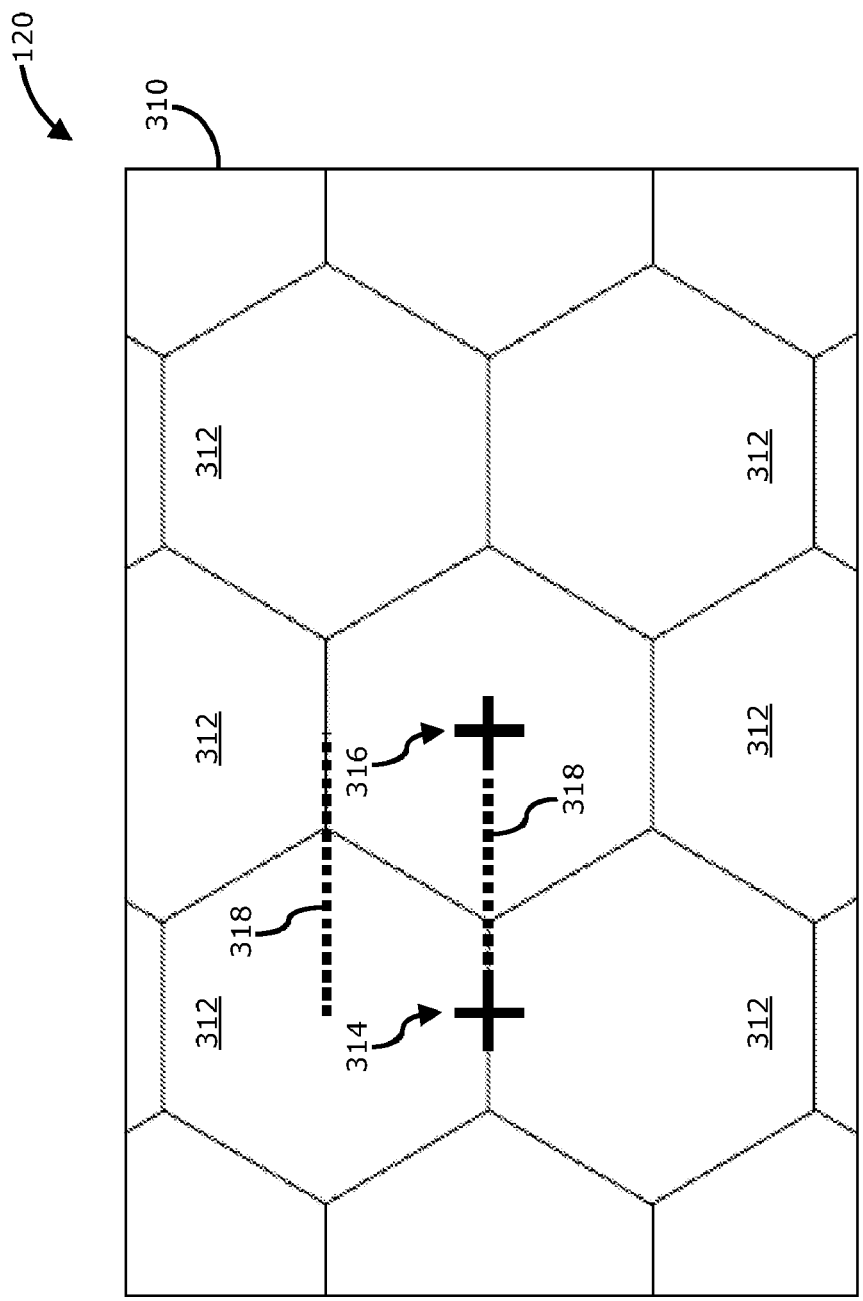
FIG. 3 is a diagram of an example exit pupil expander comprising an array of lenses in accordance with one or more embodiments.

Referring now to FIG. 3, a diagram of an example exit pupil expander comprising an array of lenses in accordance with one or more embodiments will be discussed. In one or more embodiments, exit pupil expander 120 may comprise an array 310 of multiple lenses or lenslets 312. In one or more embodiments, lenslets 312 may have a generally hexagonal shape as shown in FIG. 3. However, the shape of lenslets 312 may alternatively comprise various other shapes such as circular, square, and so on, and further may comprise various aspect ratios such that a lenslet 312 may be relatively longer in one dimension than in another dimension, for example a lenslet 312 may comprise a squashed hexagon, a rectangle, an ellipse, and so on, and the scope of the claimed subject matter is not limited in this respect. Raster scan 118 may generally sweep along two adjacent horizontal line segments 318 which may represent scan sum lines of a single cell of raster scan 118. For purposes of analysis, a first spot position 314 may represent a location on a border between two adjacent lenslets 312 and falling on scan sum lines 318, and a second spot position 316 may represent a location in the center of a lenslet 312 also falling on scan sum lines 318. The EPE pitch may comprise a distance, d, between first spot position 314 and a second spot position 316. For an ideal case of a Gaussian NA having truncation ratio of T=0.85, the line spacing of raster scan should be kept to d/2 or smaller. In case of raster pinch error near the edges of raster scan 118, as much as 3 to 4 lines of addressability per pitch d may be used to limit or reduce the appearance of Moiré artifacts, while a raster having a constant line space across the scan may only requires 2 lines of addressability per pitch d, although the scope of the claimed subject matter is not limited in this respect. Additional details regarding correction of raster pinch are described with respect to FIG. 10, below. Additional details regarding selecting a suitable lines spacing for raster scan 118 to achieve Moiré reduction for a Gaussian beam profile are described with respect to FIG. 4, below.

Figure 4:
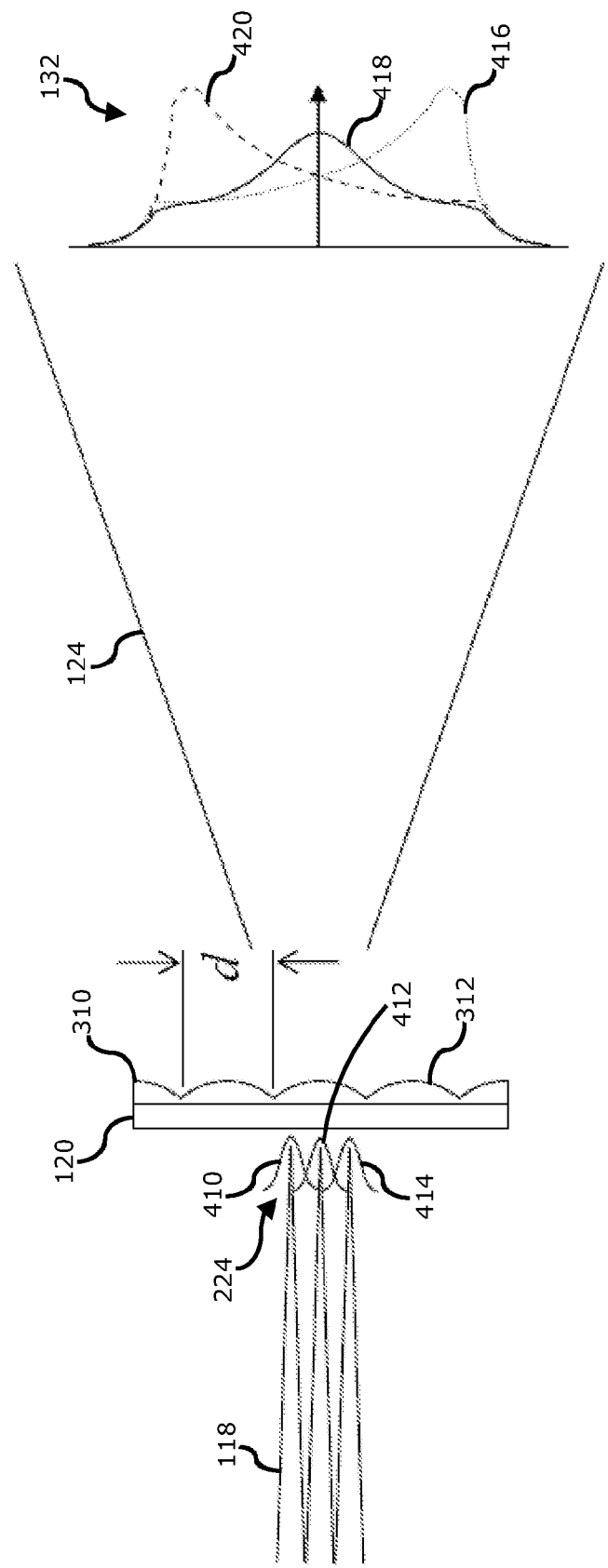
FIG. 4 is a diagram of an example time-averaged diffraction envelope resulting from a Gaussian beam profile and having a reduced moiré across a displayed image in accordance with one or more embodiments.

Referring now to FIG. 4, a diagram of an example diffraction envelope resulting from a Gaussian beam profile and having a reduced Moiré across a displayed image in accordance with one or more embodiments will be discussed. As shown in FIG. 4, raster scan 118 may address one or more lenslets 312 of an array 310 of lenslets in exit pupil expander 120 by scanning across array 310 two or more scan lines for a given lenslet 312. The beam profile of laser beam 114 used to generate raster scan 118 may comprise a Gaussian beam profile 224 as shown in FIG. 2 to generate near-Gaussian shaped spot profiles 410, 412, and 414 for each scan line per lenslet 312. The resulting diffraction pattern for any single one of spot profiles 410, 412, and/or 414, when considered alone, may result in underfilling the diffraction envelope with energy in such a way that is spot position dependent, and as a result an aliasing, or beating pattern, may occur between the array pitch of EPE 120 the line spacing of raster scan 118, thereby causing Moiré artifacts across the displayed image. For example, spot profile 410 may result in a corresponding diffraction pattern 416 which exhibits a skew in intensity toward the lower end of diffraction pattern 132, with less intensity toward the middle or upper end of diffraction pattern 132. For a given eye location within the eyebox 126, this intensity skew results in an apparent ripple, or fringe, in the Moiré pattern in the displayed image. Likewise, spot profile 412 results in a diffraction pattern 418 having greater intensity in the middle and less intensity in the lower or upper ends of diffraction pattern. Similarly, spot profile 414 may result in diffraction pattern 420 having greater intensity at the upper end of diffraction pattern 132, and less intensity at the middle or lower end of diffraction pattern. Thus, if Gaussian beams are used having Fill factor greater than F=1, such that the spot profiles formed at the raster scan 118 are smaller than the lenslet pitch, and the addressability $A=d/l_s$ for EPE pitch d and line spacing $l_s$, is set to A=1, meaning on average there is only about a single scan line per lenslet 312 in EPE 120, the resulting diffraction pattern 132 may not be even and thereby generate Moiré artifacts in the displayed image. However, in one or more embodiments, the spot energy may be distributed evenly within a cell or lenslet 312 over time so that raster scan 118 may provide more than one scan line per lenslet 312 to provide an addressability of A>1. An addressability of A>1 may be accomplished by providing additional addressability with MEMS scanner 116 when defining display pixel size p on order of EPE pitch d. By doing so, raster scan 118 will result in two or more scan lines per lenslet 312 so that over time, individual corresponding diffraction patterns 416, 418, and 420 resulting from spot profiles 410, 412, and 416 will combine to result in an overall diffraction pattern 132 that is sufficiently constant over the entire diffraction envelope 132 to reduce or minimize the Moiré effect in the displayed image. Thus, in one or more embodiments, if a Gaussian beam profile is utilized, Moiré artifacts may be effectively reduced or eliminated by utilizing additional addressability of MEMS scanner 116 to cause raster scan 118 to provide more than one scan line per lenslet 312 to have an addressability of A>1, however the scope of the claimed subject matter is not limited in this respect. For the case where the resulting spotsize is on order of half the cell pitch, an addressability of A≧2 is desirable for minimizing Moiré.

Figure 5:
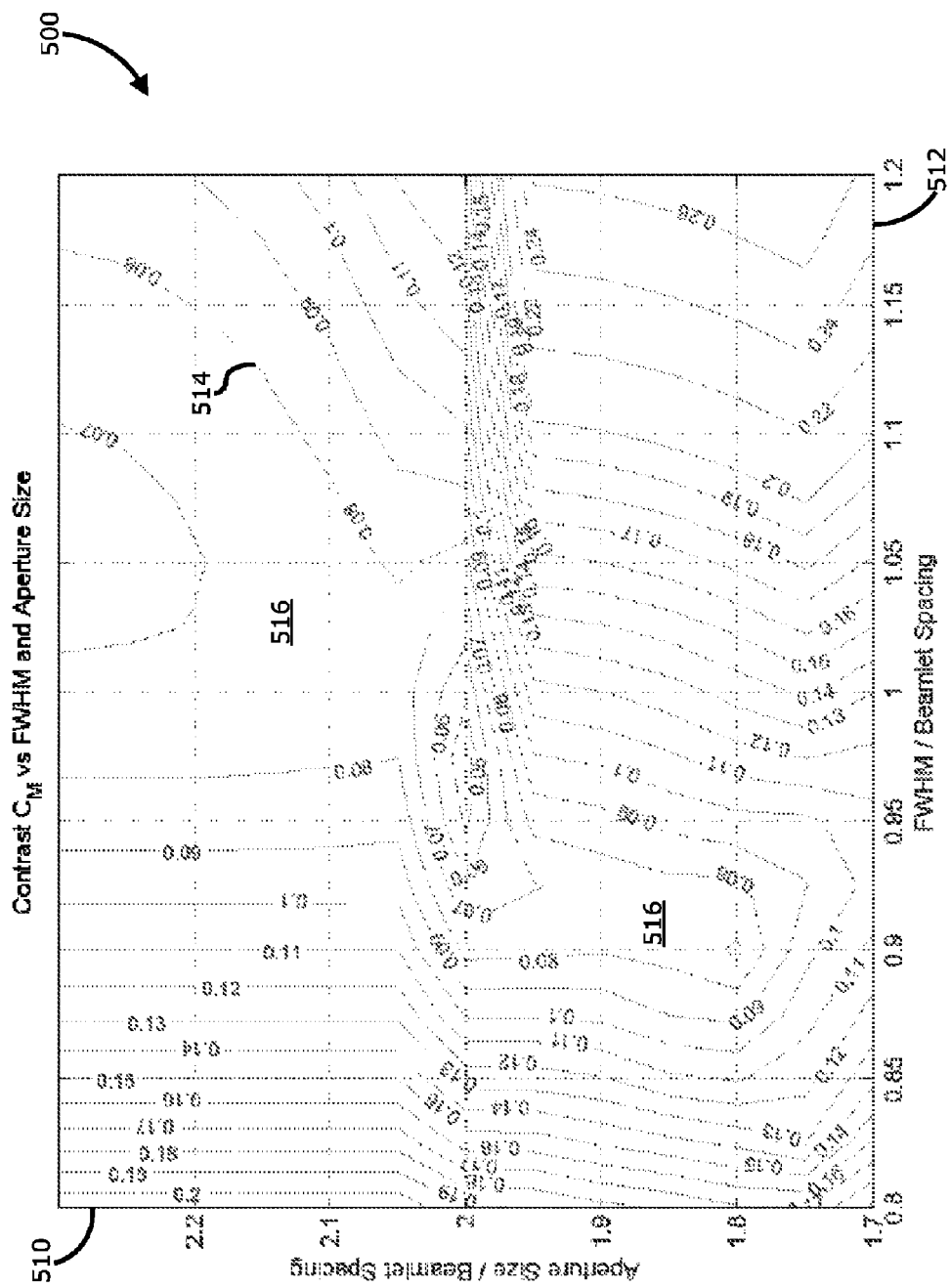
FIG. 5 is chart illustrating contrast values plotted for selected full width, half-max Gaussian beam size and aperture size to select a suitable tiling artifact in a displayed image in accordance with one or more embodiments.
Figure 6A:
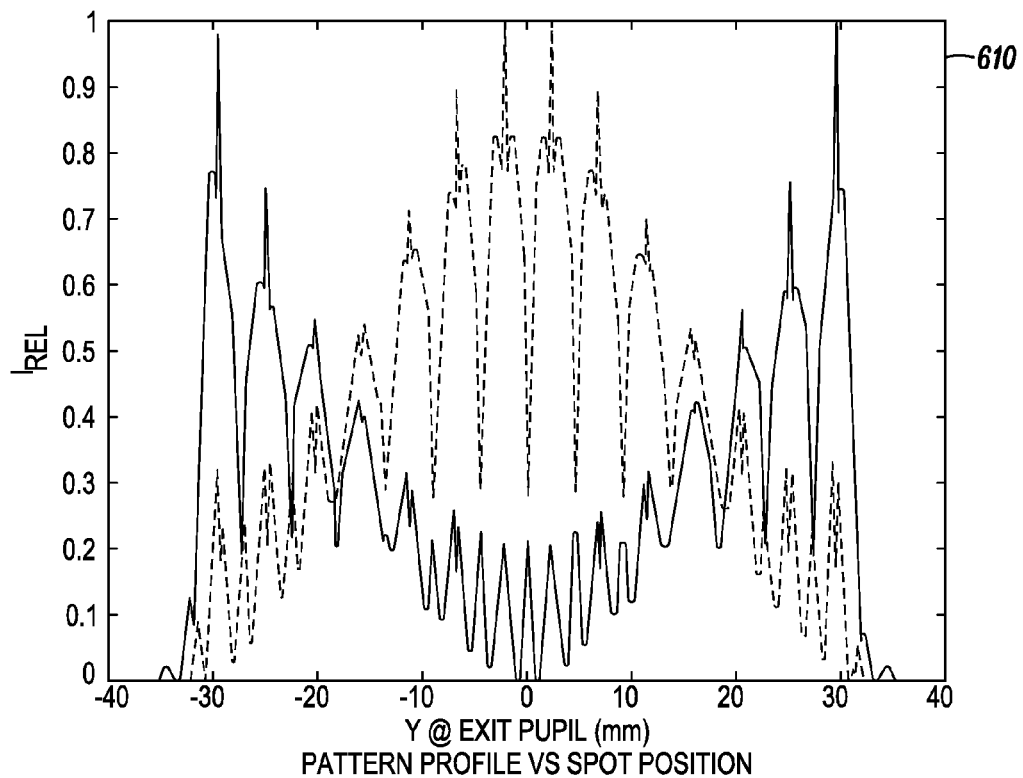
FIG. 6 is a diagram which includes: beamlet pattern uniformity across the eyebox due to different spot positions, a beamlet pattern resulting from scanning an EPE cell, and resulting apparent eyebox uniformity for a scanned beam display in accordance with one or more embodiments.
Figure 6B:
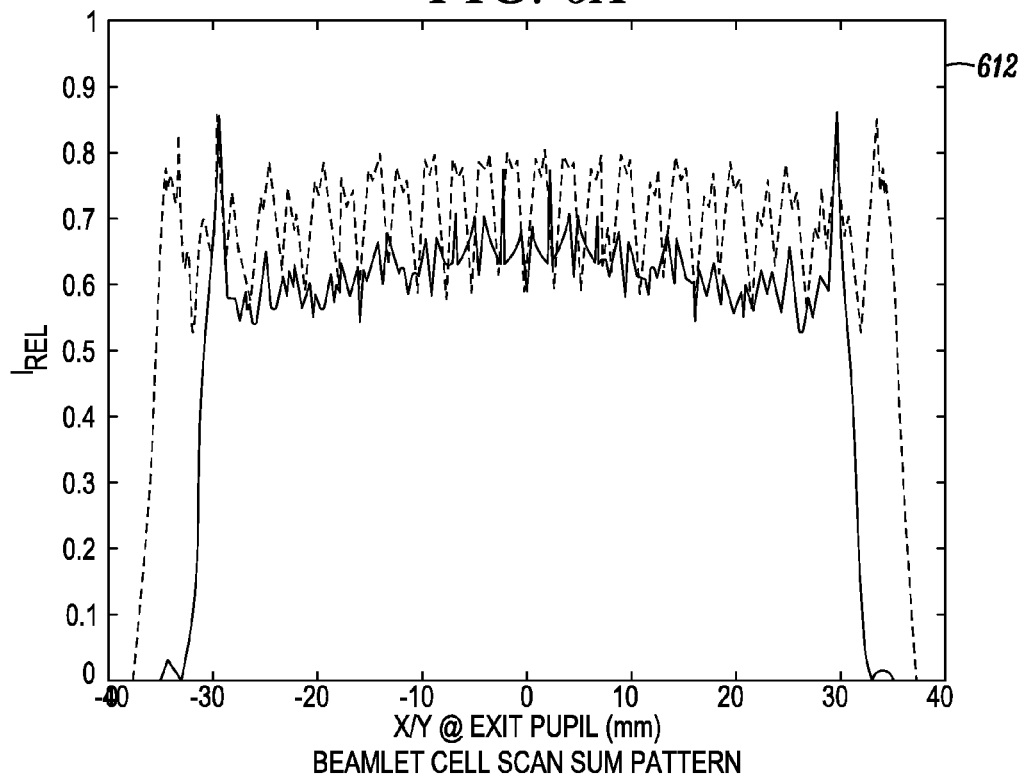
Figure 6C:
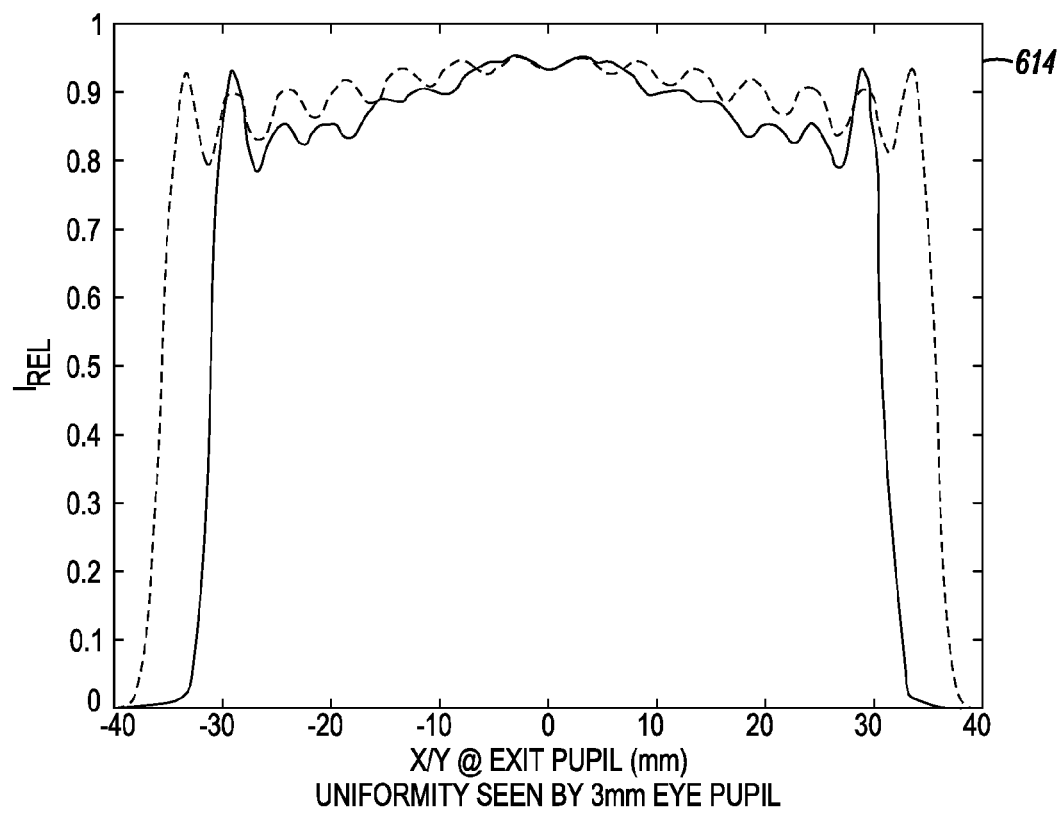
Figure 6D:
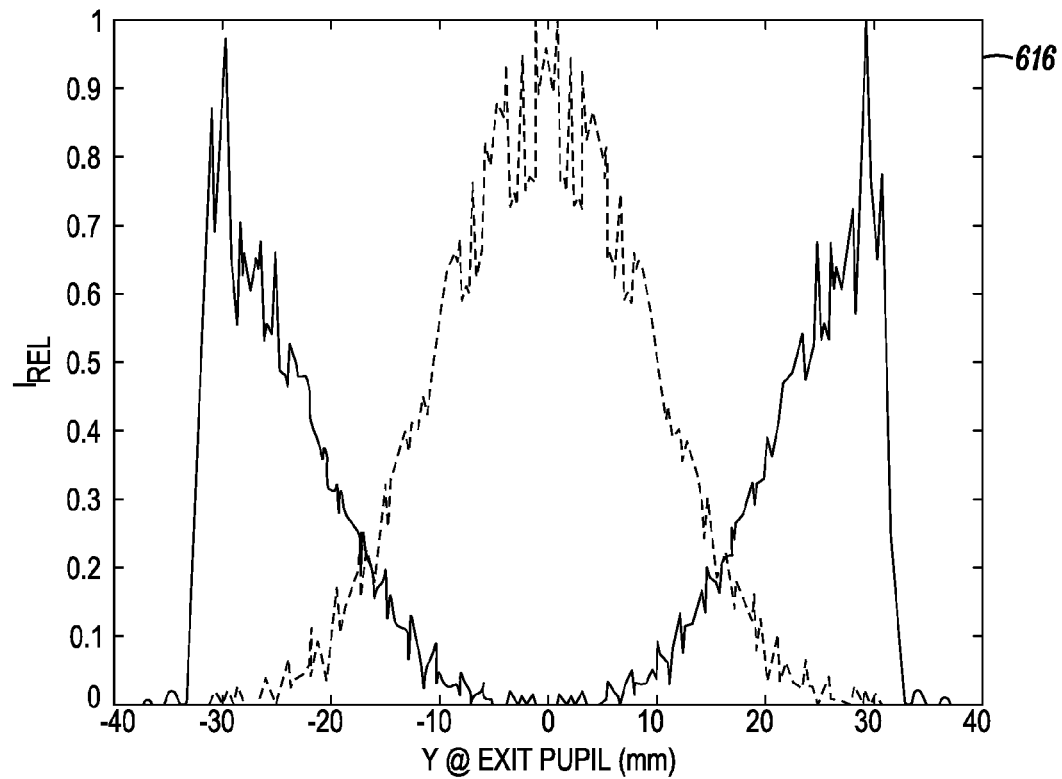
Figure 6E:
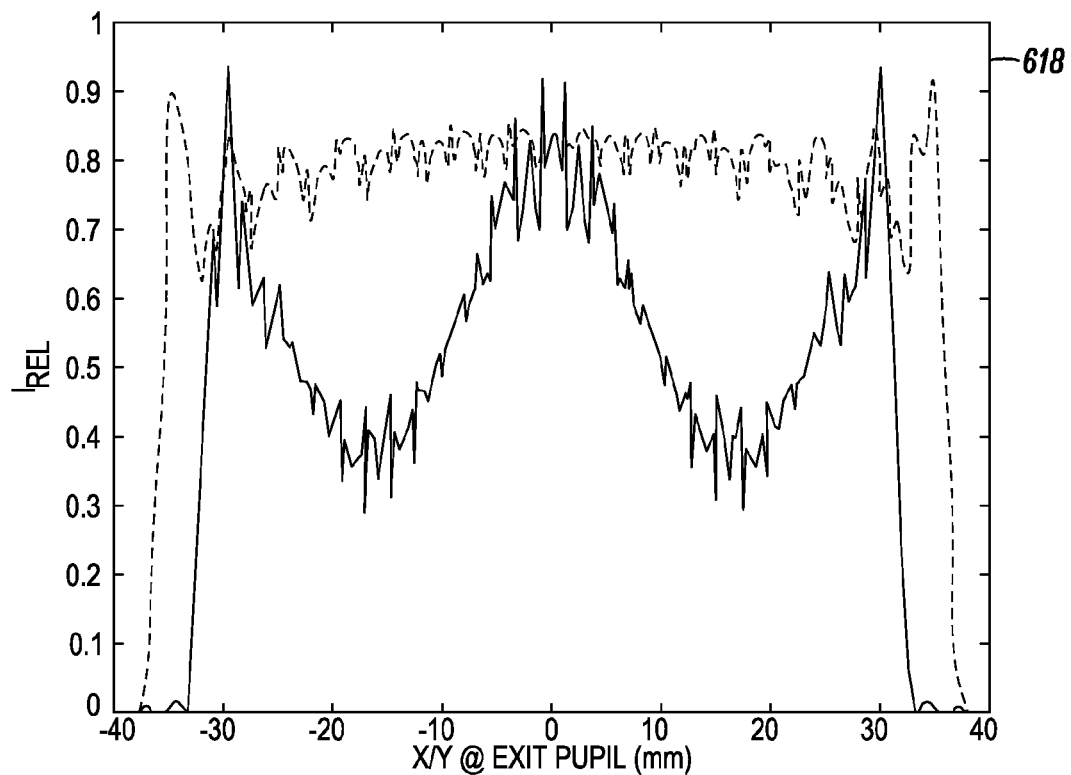
Figure 6F:
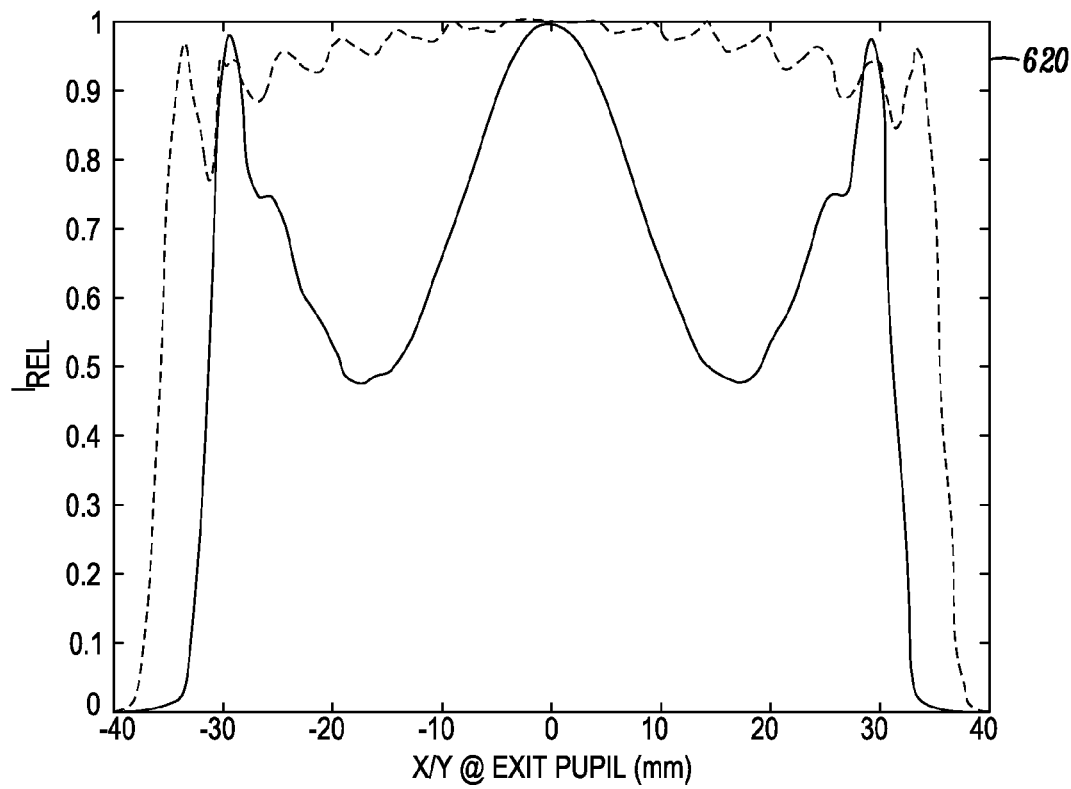
Figure 6G:
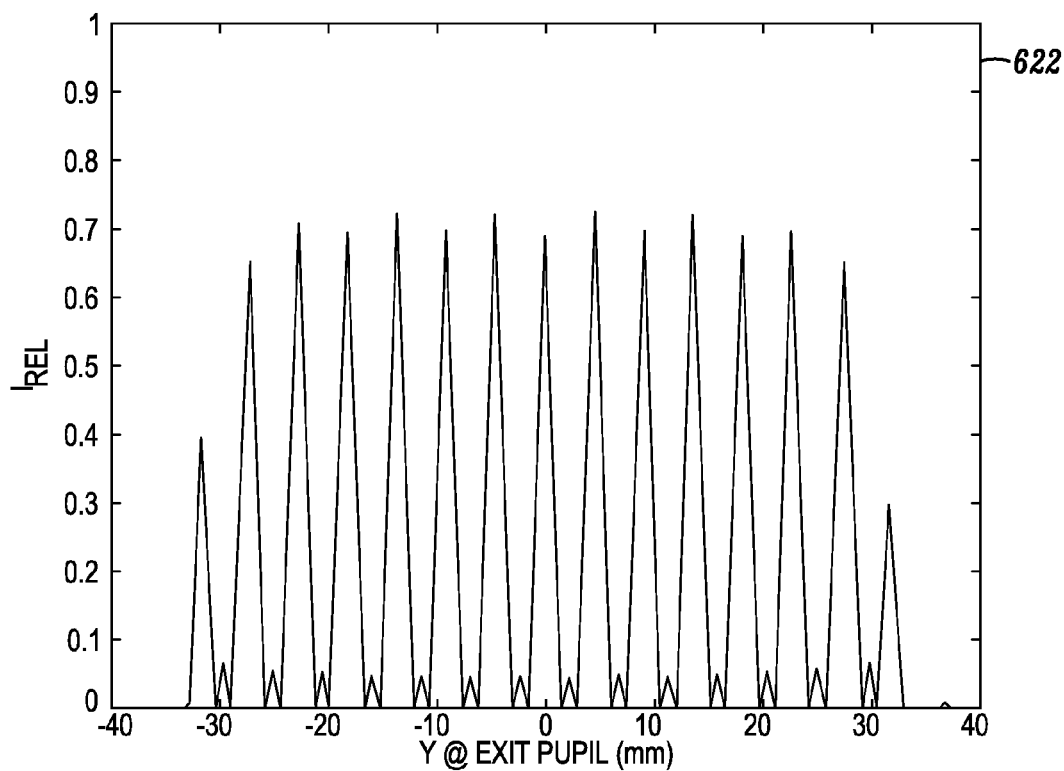
Figure 6H:
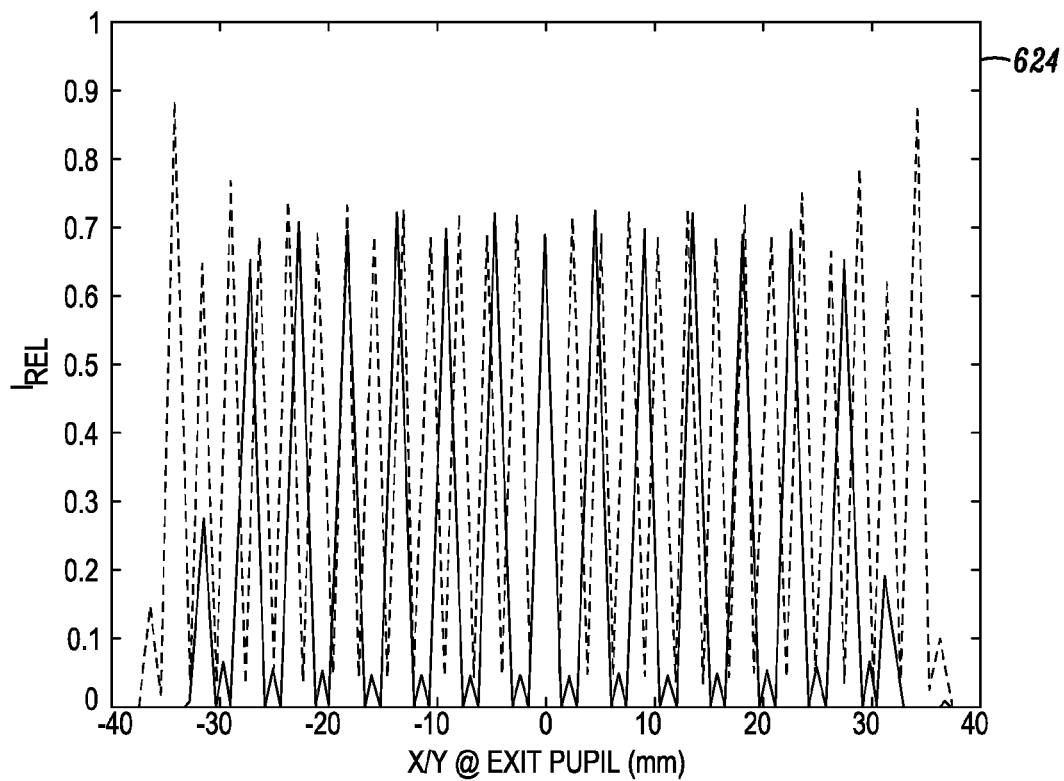
Figure 6I:
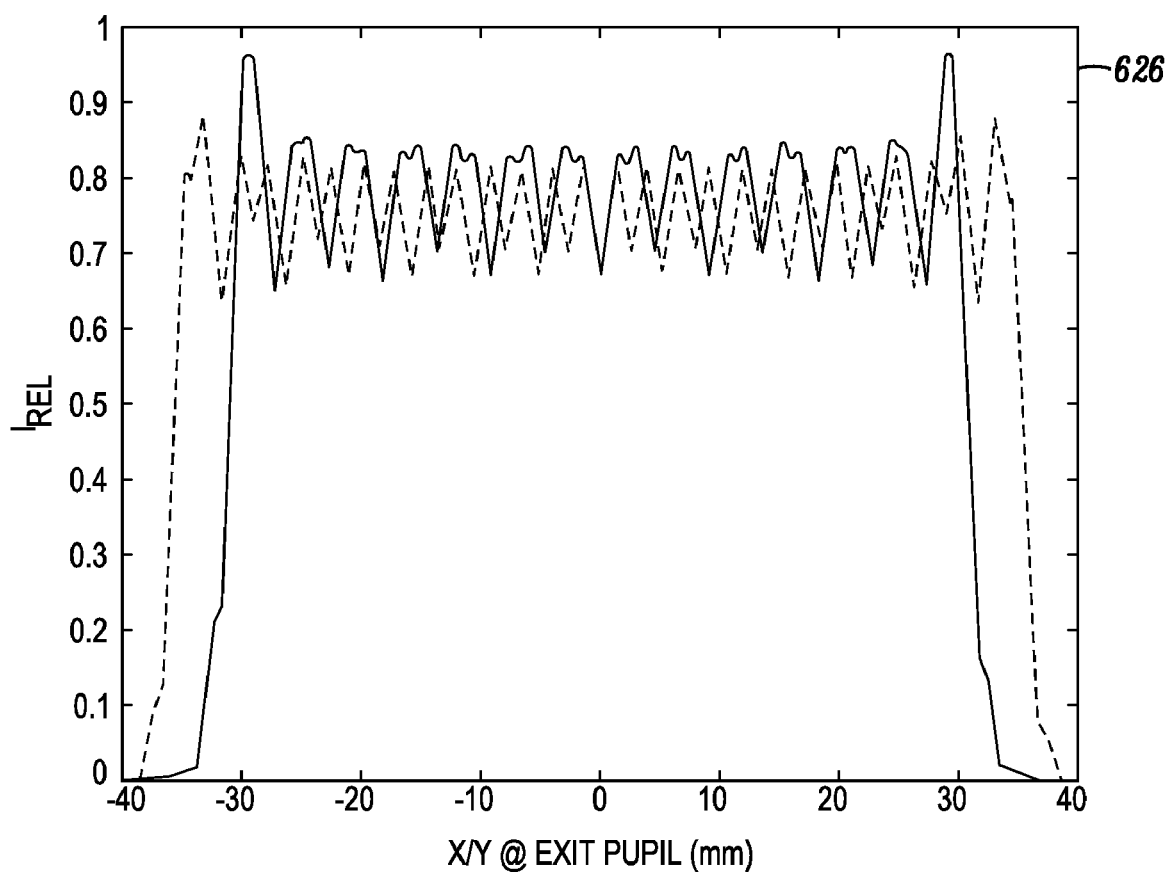
Figure 7A:
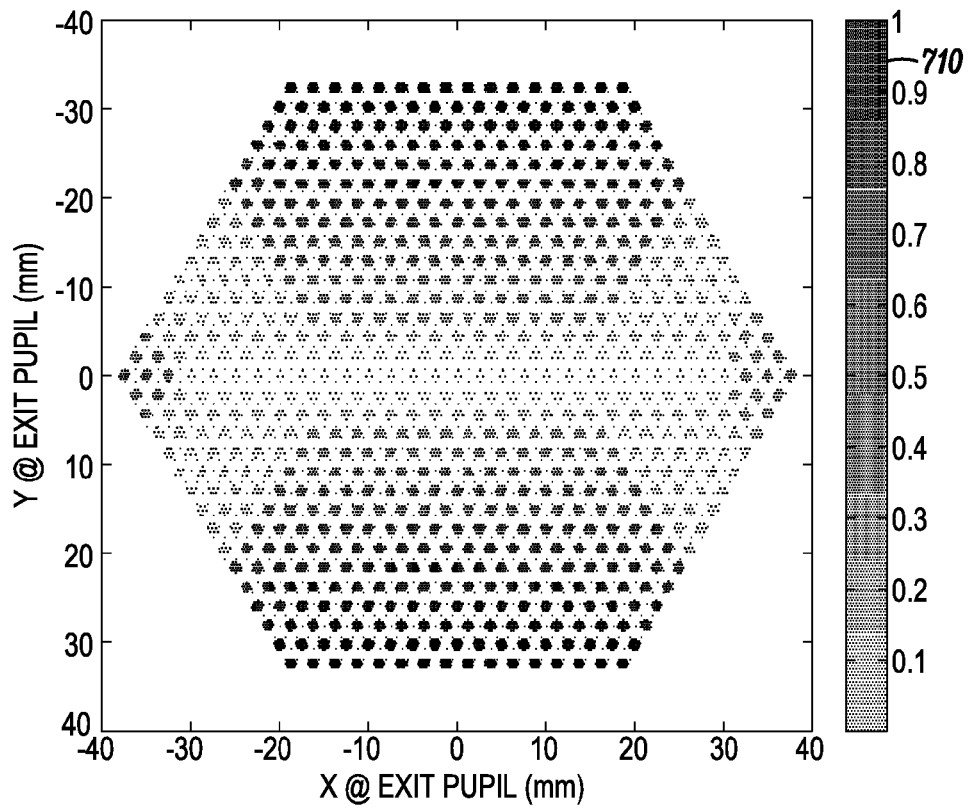
FIG. 7 is a diagram of resulting tiling patterns for a spot illuminating various positions of a given lens of an exit pupil expander having an array of lenses, and the resulting uniformity of a scanned cell as seen by the eye in accordance with one or more embodiments.
Figure 7B:
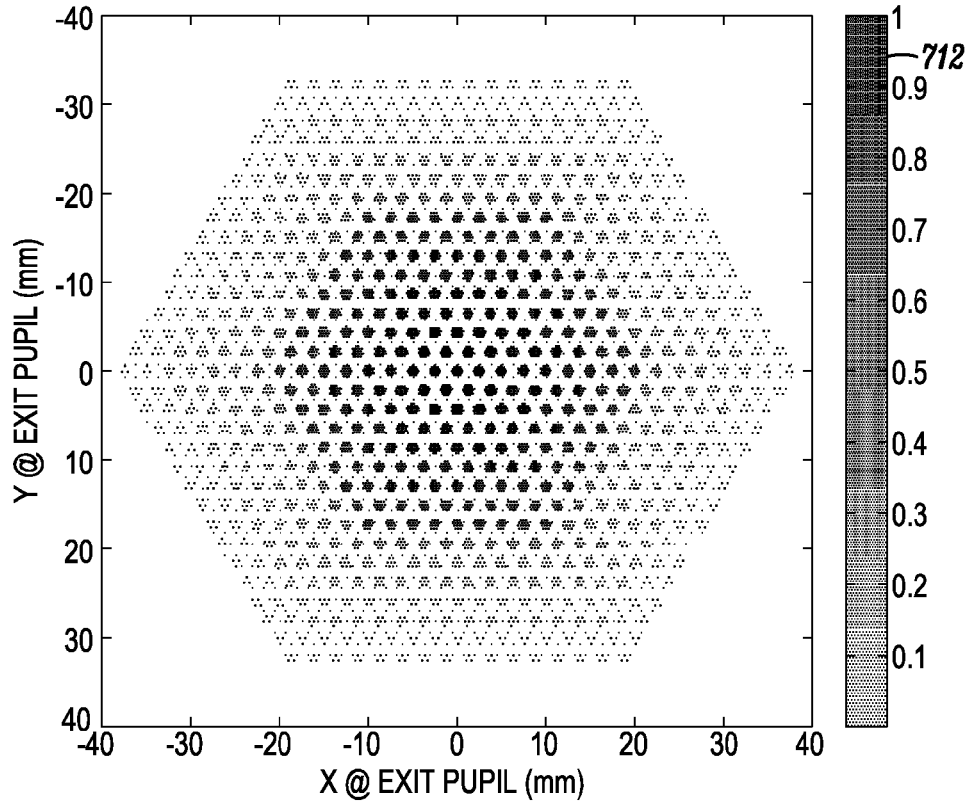
Figure 7C:
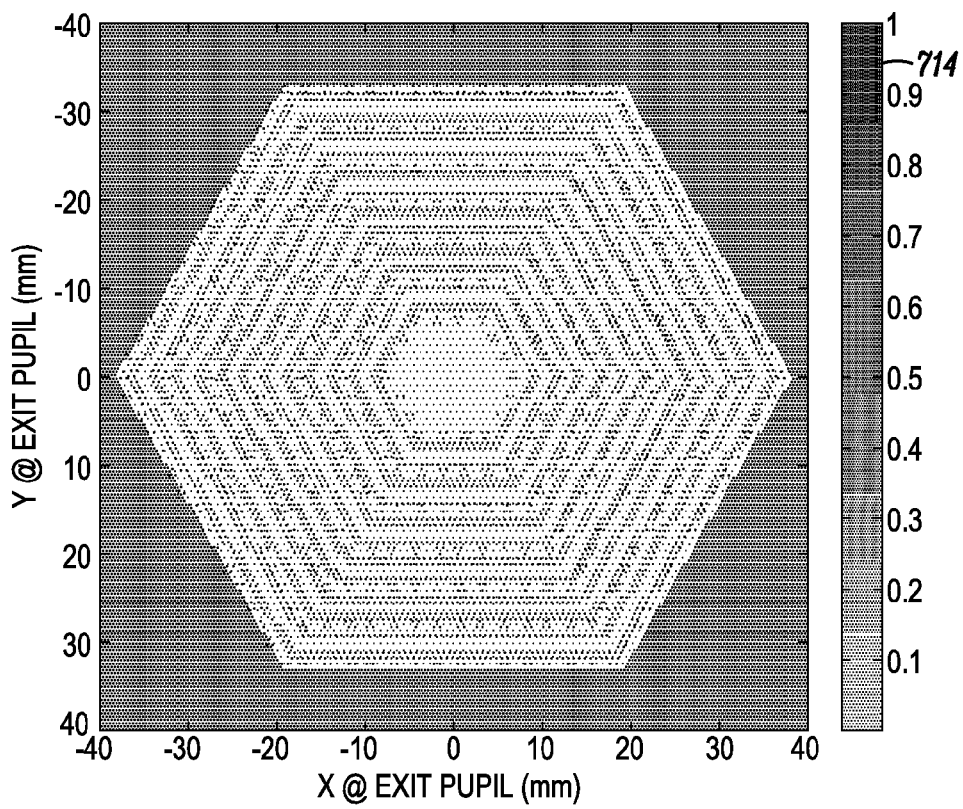
Figure 7D:
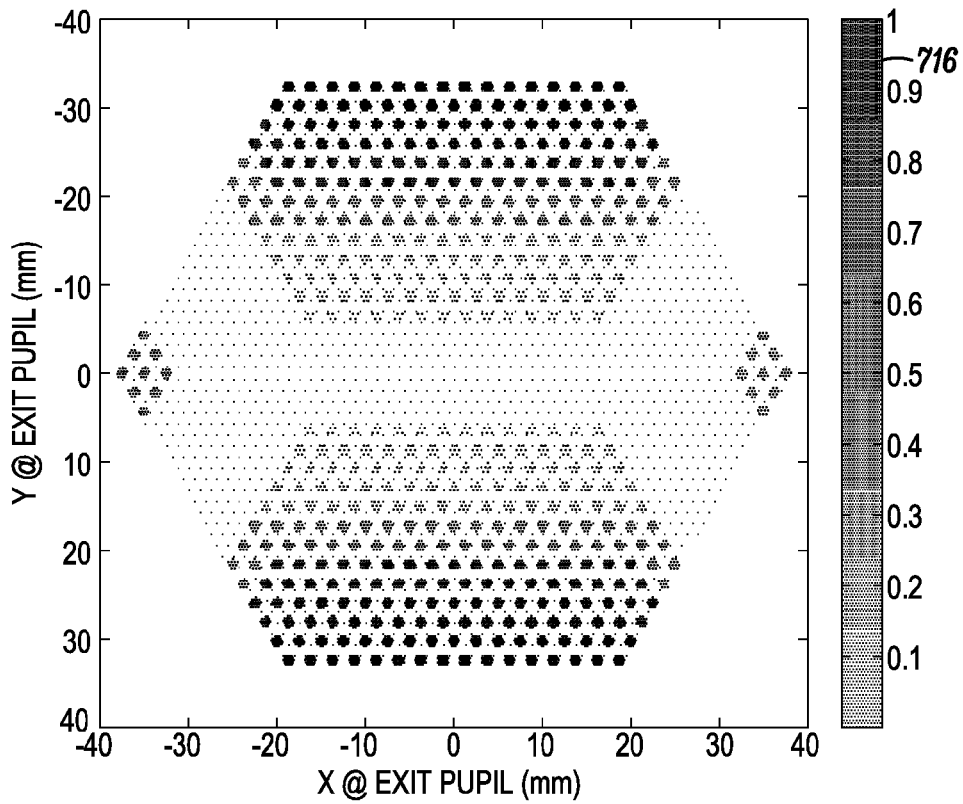
Figure 7E:
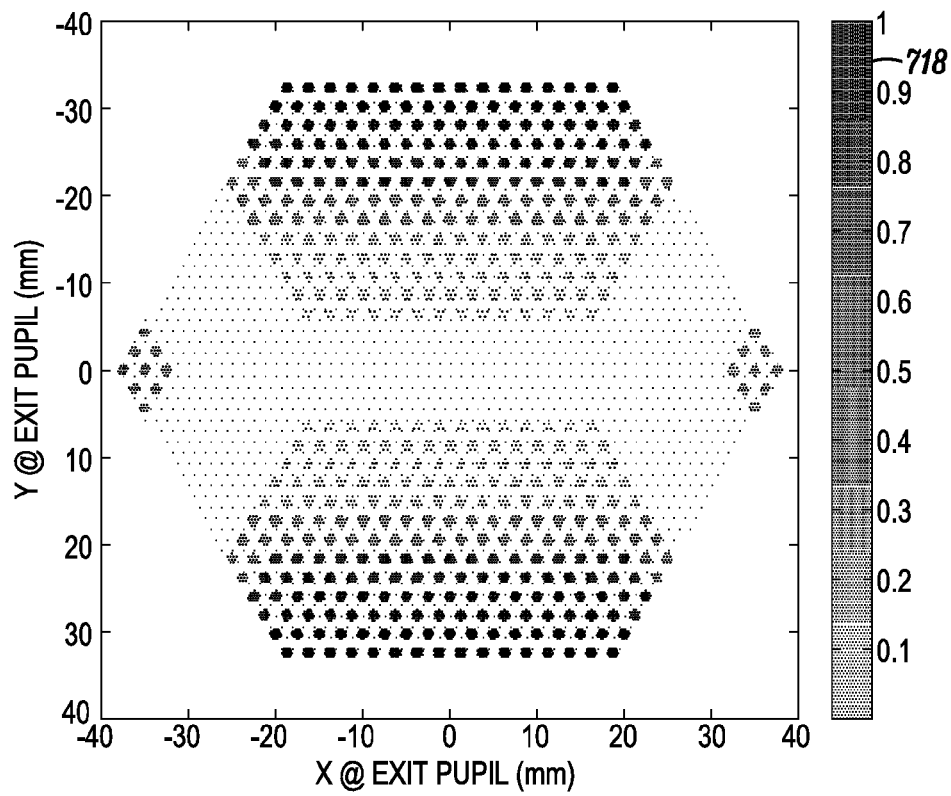
Figure 7F:
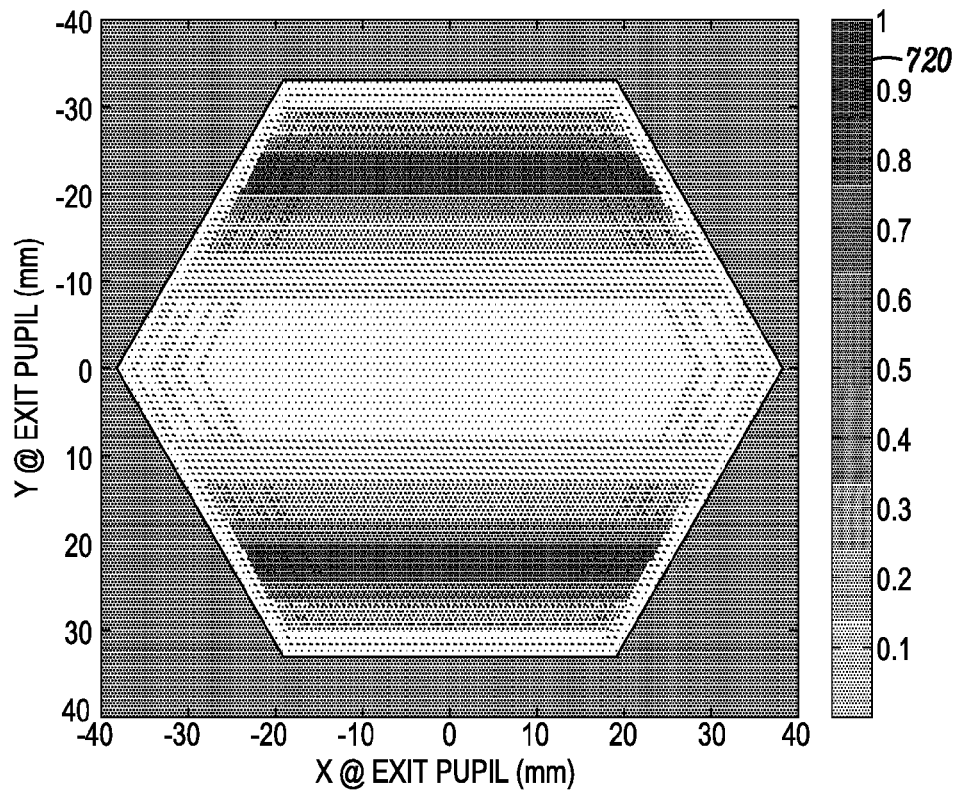
Figure 7G:
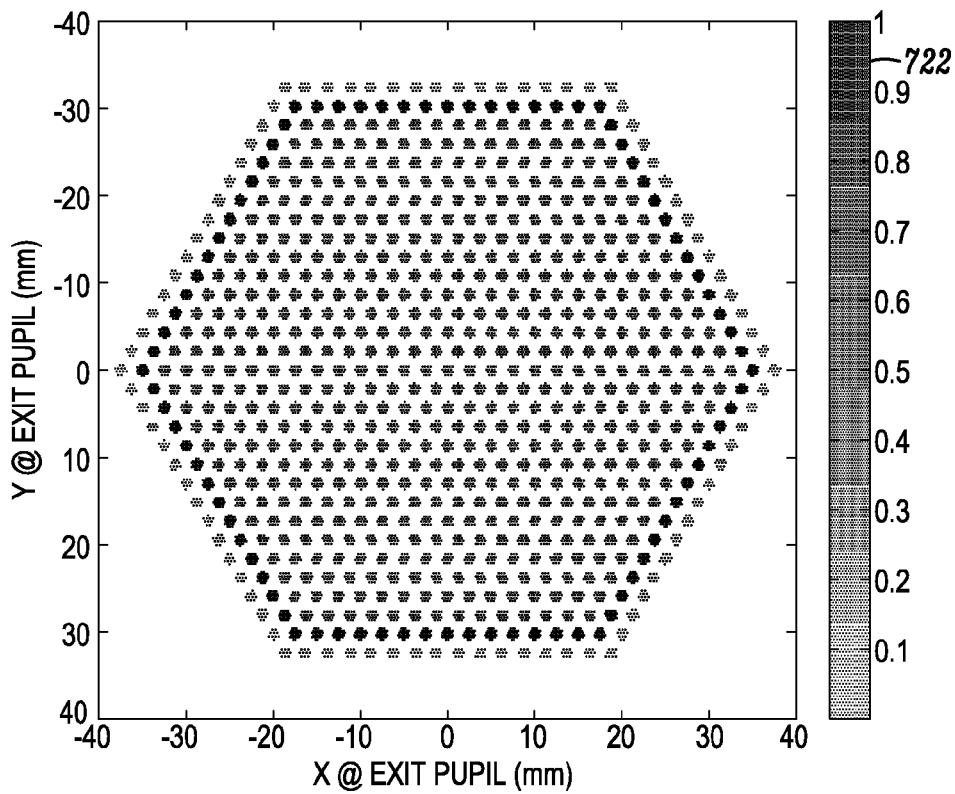
Figure 7H:
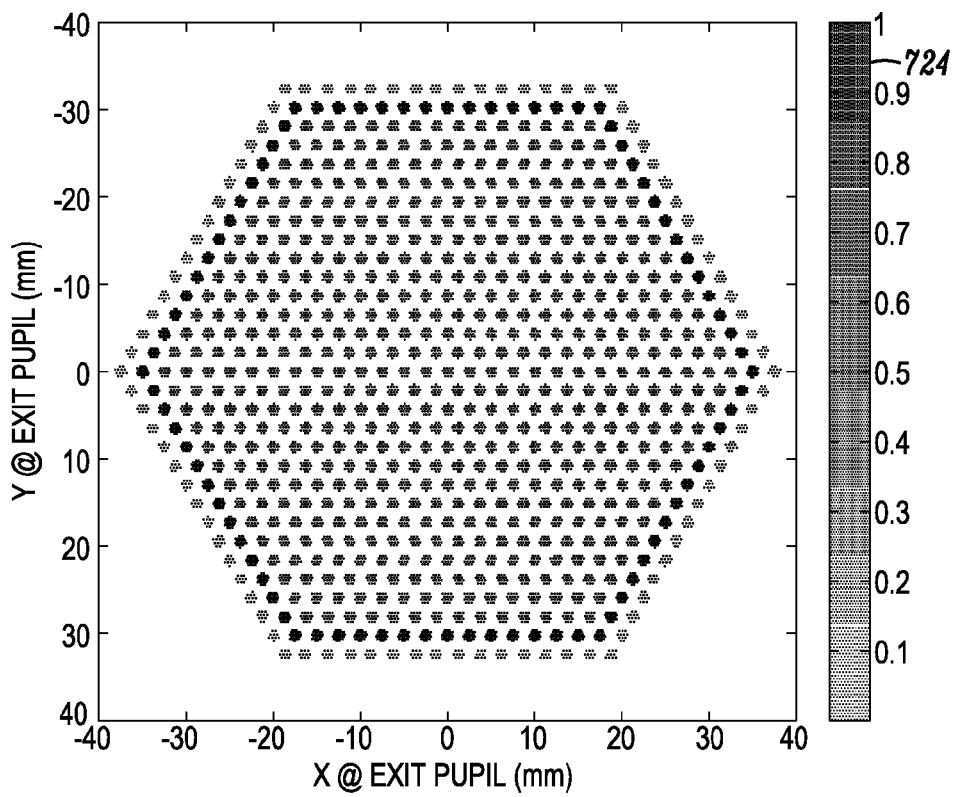
Figure 7I:
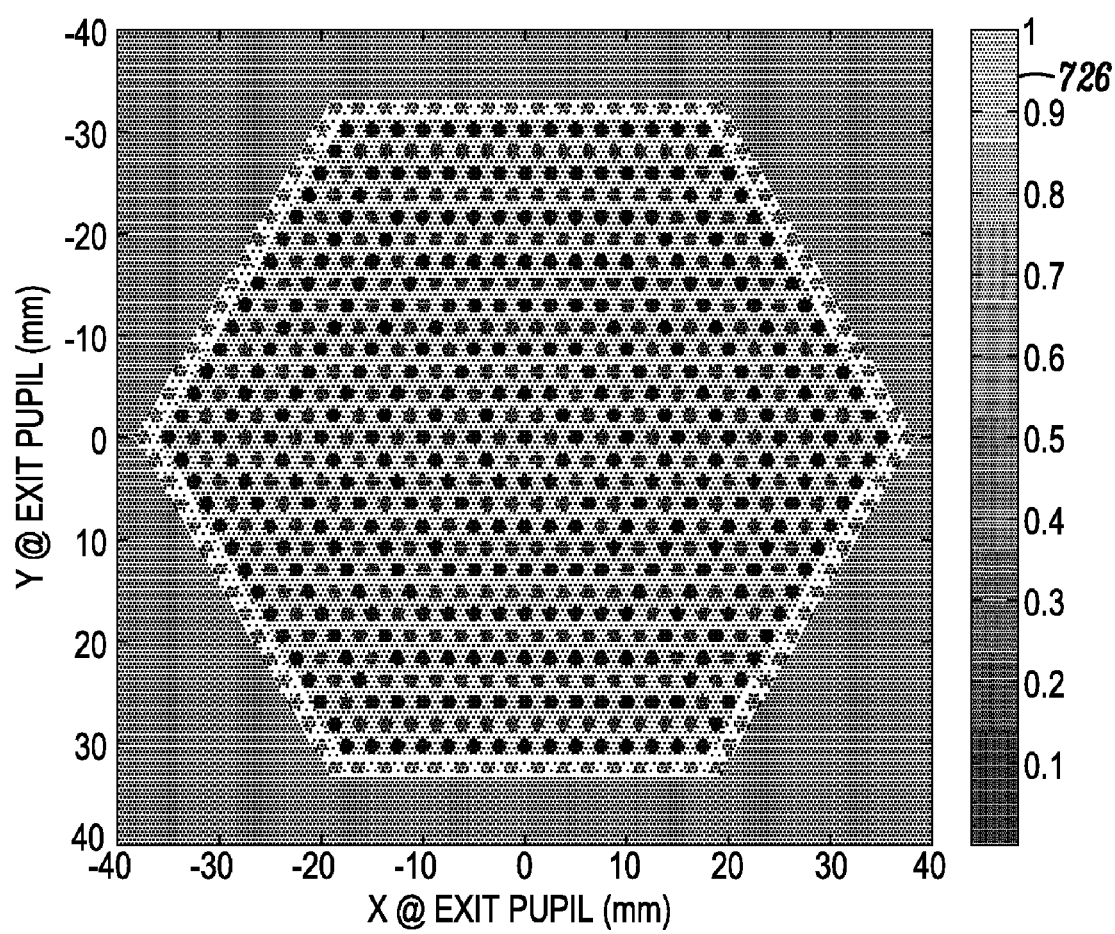

Referring now to FIG. 5, a chart illustrating contrast values plotted for selected full width, half-max and aperture size to select a suitable tiling artifact in a displayed image in accordance with one or more embodiments will be discussed. FIG. 5 illustrates the level of contrast expected from the energy sum, over time, of various sized Gaussian profiles with various clipping levels in terms of Michelson contrast for a hexagonal EPE layout as shown in FIG. 3. In one or more embodiments, the minimum contrast is for the case of a Gaussian beamlet having a full-width at half maximum (FWHM) set to F=1, and clipped with aperture set to F=2. For a truncation ratio defined as $T=w_o/a$, for beam $1/e^2$ width $w_o$ and clipping aperture size a, the ideal truncation ratio corresponds to T=0.85. Integer multiples of F could also be used to obtain higher uniformity in the exit pupil, but in order to avoid Moiré artifacts in such an embodiment, higher scan-line addressability is required as discussed with respect to FIG. 4, above, due to further reduced spot size at EPE. Furthermore, in one or more embodiments it is also possible to utilize elliptical beams for laser beam 114 and still achieve reasonably higher levels of uniformity across eyebox 126 by either using different integer multiples of F in orthogonal dimensions or by compressing the EPE pitch in a particular dimension to complement the aspect ratio of the input beam, although the scope of the claimed invention is not limited in this respect. Thus, as shown in FIG. 5, plot 500 shows Michelson contrast $C_M$ contour maps for Gaussian tilings with round apertures having various size and clipping. As shown in plot 500, minimum contrast values of less than 0.08 for case of Gaussian may occur with a FWHM at F=1 and aperture size set to F=2 which are located generally in the region 516 bound by the contour 514 representing a Michelson contrast of $C_M=0.08$ in which other suitable values for FWHM and/or aperture size may likewise be selected, although the scope of the claimed subject matter is not limited in this respect.

Referring now to FIG. 6 and FIG. 7, a diagram of beamlet cell scan patterns for a scanned beam display in accordance with one or more embodiments will be discussed with respect to FIG. 6, and a diagram of resulting tiling patterns for a given lens of an exit pupil expander at various positions in the array of lenses in accordance with one or more embodiments will be discussed with respect to FIG. 7. FIG. 6 and FIG. 7 show simulation results for a HUD system using an EPE pitch of d=139 μm. Plot 610 shows a pattern profile versus spot position, plot 612 shows a beamlet cell scan sum pattern, and plot 614 shows a uniformity seen by a 3 mm diameter eye pupil. Plots 610, 612, and 614 are shown for the case where the spot size is at or near 75 μm FWHM. Plot 710 shows the resulting beamlet pattern at position 314 in EPE array 310 of FIG. 3, and plot 712 shows the resulting beamlet pattern at position 316 in EPE array 310. Plot 714 shows the resulting intensity uniformity seen at viewer's eye 128 with a 3 mm diameter pupil size. Plots 710, 712, and 714 likewise represent a spot size of about 75 μm FWHM. Other spot sizes may likewise be utilized to obtain a desired tradeoff between tiling artifacts and Moiré artifacts. For example, for a spot size at or near 60 μm FWHM, slightly more Moiré artifacts may result with less tiling artifacts. Likewise, for a spot size of 90 μm FWHM, slightly less Moiré artifacts may result with more tiling artifacts. For comparison, plots 616, 618, and 620 show the same data as plots 610, 612, and 614, respectively, but with a spot size of 50 μm, whereas plots 622, 624, and 626 show the same data as plots 610, 612, and 614, respectively, but with a spot size of 139 μm. As can be seen from plot 620, if the selected spot size is too small, too much variation in the contrast plots is seen which results in too noticeable of a Moiré pattern in the displayed image. Likewise, as can be seen from plot 622, if the selected spot size is too large, the beam pattern profile, although independent of spot position for this case, will have too much non-uniformity across eyebox 126 and therefore too much tiling may be present in the displayed image. In accordance with one or more embodiments, the spot size may be selected closer to an optimum, or nearly optimum, balance between reduction of tiling artifacts and reduction of Moiré artifacts, for example as seen in plots 610, 612, and 614 where the spot size is 75 μm, which is relatively close to approximately one-half of the EPE pitch of d=139 μm, although the scope of the claimed subject matter is not limited in this respect. Similarly, as shown in FIG. 7, plots 716, 718, and 720 show the same data as plots 710, 712, and 714, respectively, but with a spot size of 50 μm, whereas plots 722, 724, and 726 show the same data as plots 710, 712, and 714, respectively, but with a spot size of 139 μm. As can be seen in plot 720, the light and dark bands indicate intensity peaks and troughs which result in Michelson contrast values, thereby resulting in a Moiré pattern which will have a level of contrast that will be too noticeable in the displayed image, for example as shown in image 810 of FIG. 8, below. Likewise, as can be seen in plot 726, individual beamlets are noticeable, thereby resulting in gapping and tiling in the displayed image, as can be seen in image 818 in FIG. 8, below. In plot 714, intensity bands and individual beamlets are less noticeable than in plot 720 and plot 726, thereby representing a more ideal image with a spot size at or near 75 μm, which is closer to approximately one-half the EPE pitch of d=139 μm, although the scope of the claimed subject matter is not limited in this respect.

It would expected that an optimum spot size might be equal to, or approximately equal to one-half the EPE pitch of d=139 μm, which in the present case would be at or near about 69.5 μm FWHM. However, for a Gaussian beam interacting with a hexagonal EPE array, it can be shown mathematically that the ideal limiting aperture is at F=2 for the beamlet nearest-neighbor dimension, for Fill factor F defined as $$F_{flats} = \frac{\sqrt{3}\,Ad}{2z\lambda}$$

such that the Gaussian beam profile has a truncation ratio T=0.85 within the F=2 NA profile size. Now, the resulting spot sizes associated with various clipped beams within this region of interest can be defined as $$s_{fwhm} = \frac{\sqrt{3}\,dK_{fwhm}(T, C_a)}{4C_{fwhm}}$$

For $$K_{fwhm}(T, C_a) = \left(1.036 + \frac{0.624}{C_a^2 T^2} - \frac{0.116}{C_a T}\right)$$

where $$T = \frac{w_{1/e^2}}{a}$$

and the spot-forming NA representing the F=2 cone is defined as $$NA_{(F=2)} = \frac{2\lambda}{\sqrt{3}\,d}.$$

Since the minimum contrast for tiling shown in FIG. 5 is near $C_a=2$ and $C_{fwhm}=1$, we have $K_{fwhm} \sim 1.18$ and T=0.85, thus forming a spot size of 71.2 μm for the near-ideal, minimum contrast Gaussian case, which is on the order of d/2, or half the pitch of the EPE array. Parameters near these represent the case of achieving minimum tiling artifacts. Since the spot size is smaller than the lenslet size, Moiré can be avoiding by using an appropriate level of addressability. Further, human factors studies have concluded that users tend to prefer an image have some slightly noticeable Moiré artifacts over an image having some slightly noticeable tiling artifacts. Thus, in one or more embodiments, the spot size may be selected to prefer Moiré over tiling for a given addressability, for example a spot size closer to 60 μm FWHM may be utilized to provide slightly more Moiré artifacts and less tiling artifacts, but to still have a reduced level of Moiré artifacts to a level satisfactory for viewing, although the scope of the claimed subject matter is not limited in these respects. It is possible that Moiré can still occur even for an optimum case if the line spacing of raster scan is too large, thereby implying that raster ripple should be minimized for optimum results. Reduction of raster ripple is shown in and described with respect to FIG. 10, below. The effect of providing a reduced Moiré is shown in and described with respect to FIG. 8, below.

Figure 8:
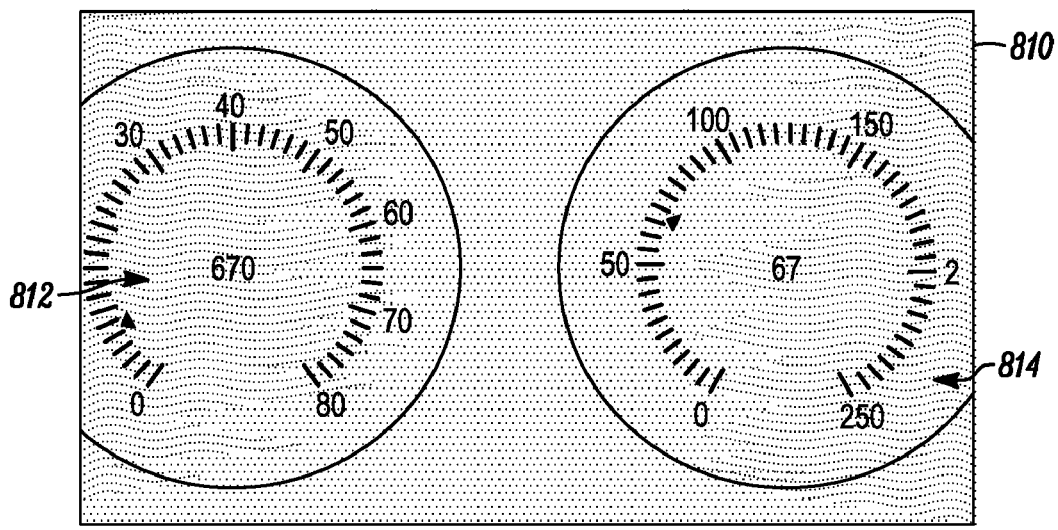
FIG. 8 is a diagram of an image displayed by a scanned beam display showing the reduction of moiré as well as tiling artifacts in the image in accordance with one or more embodiments.
Figure 8:
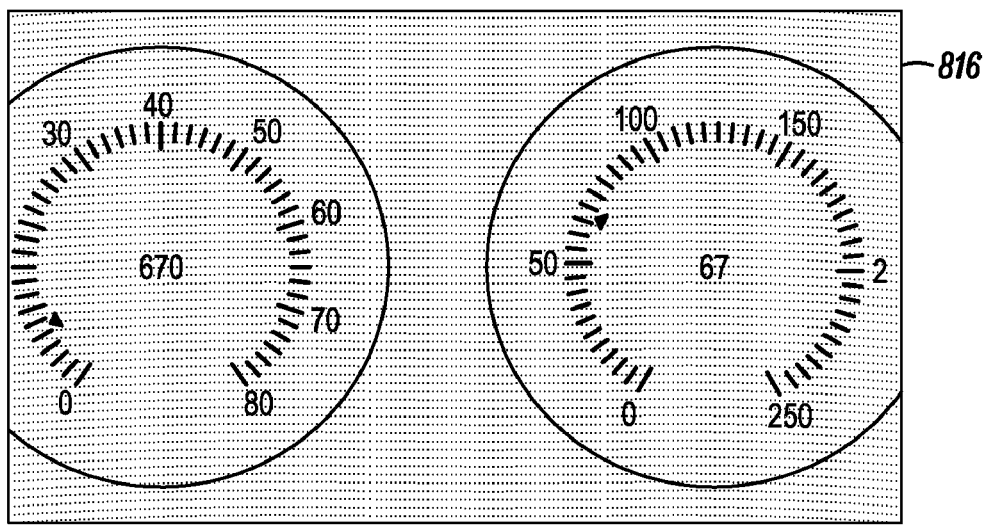
Figure 8:
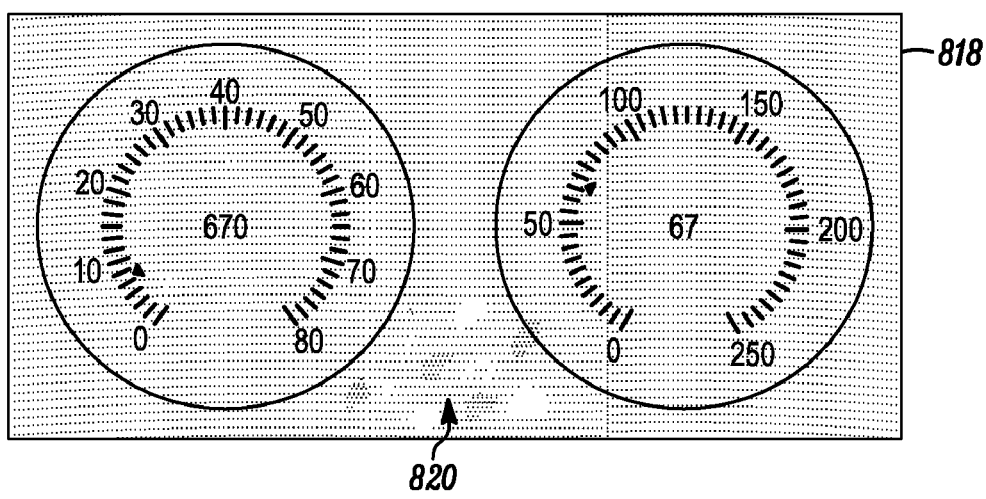

Referring now to FIG. 8, a diagram of an image displayed by a scanned beam display showing the reduction of moiré as well as tiling artifacts in the image in accordance with one or more embodiments will be discussed. An image displayed by scanned beam display 100 without reduction of Moiré is shown at 810, where Moiré rippling can be seen at regions 812 and 814. An image displayed by scanned beam display 100 having Moiré reduction as shown at 816 having no regions of noticeable Moiré. When set correctly, no tiling artifacts are visible, and the level of contrast of the Moiré pattern is diminished to a level that is not visible to the eye, achieving excellent uniformity in both the near field and far-field of the display system. Thus, in one or more embodiments, if the spot size and raster scan 118 are suitably selected, no tiling artifacts are visible, and the level of contrast of the Moiré pattern may be diminished to a level that is not visible to the eye, thereby achieving sufficient uniformity in both the near field 134 and far field 136 of scanned beam display 100, although the scope of the claimed subject matter is not limited in this respect.

Figure 9:
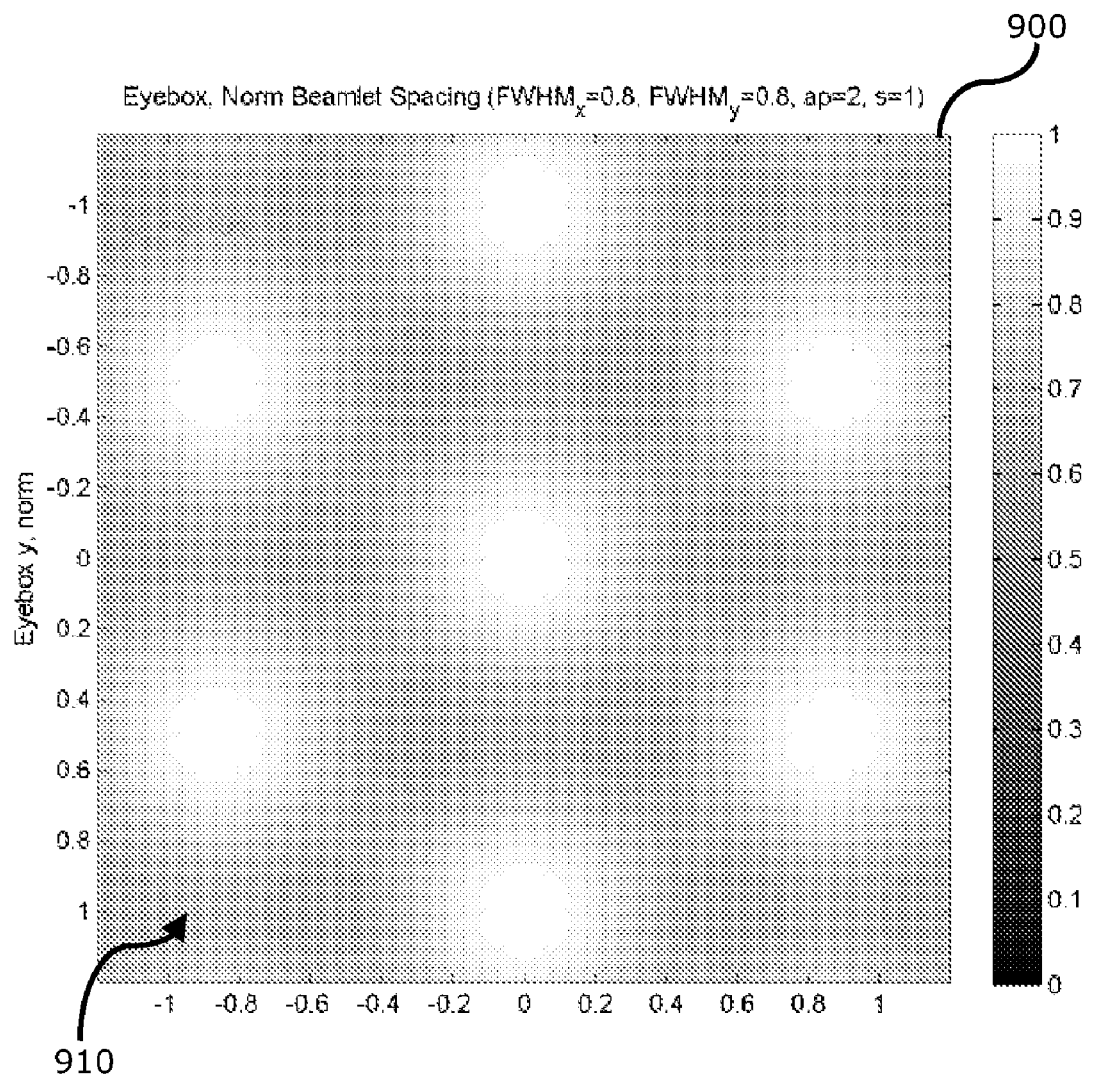
FIG. 9 is an example tiling pattern of an image in accordance with one or more embodiments.

Referring now to FIG. 9, an example tiling pattern of an image in accordance with one or more embodiments will be discussed. Image 900 illustrates an example of tiling artifacts that may result from using a beam NA profile, thus Fill factor, that is not properly selected with respect to the EPE pitch in conjunction with aperture size to result in a satisfactory Michelson contrast across the eyebox. Referring back to FIG. 5, the tiling pattern in image 900 shown in FIG. 9 may result from a spot size FWHM to beamlet spacing ratio of 0.8 for an aperture size to beamlet spacing ratio of 2. Per plot 500 of FIG. 5, for an aperture size to beamlet spacing ratio of about 2, the spot size FWHM to beamlet spacing ratio should be closer to about 1 to fall within region 516 to have a Michelson contrast of less than 0.08 to result in no apparent tiling. It should be noted that image 900 is merely one example of tiling artifacts that may be reduced and/or eliminated by proper selection of FHWM and aperture size with respect to beamlet spacing to result in a suitable Michelson contrast as indicated from plot 500 of FIG. 5, and the scope of the claimed subject matter is not limited in this respect.

Figure 10:
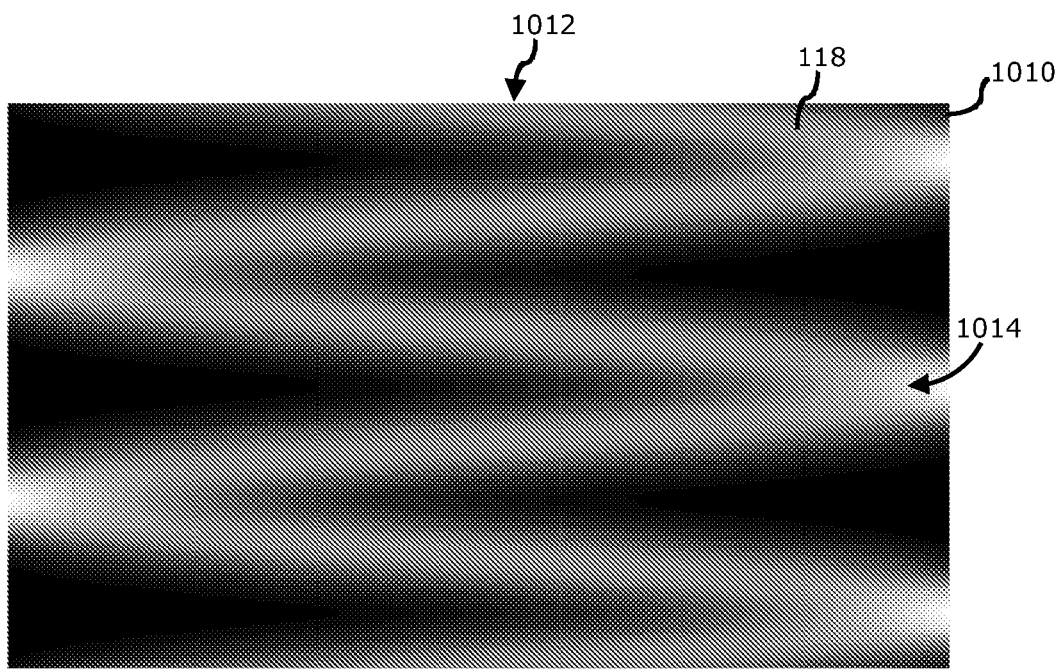
FIG. 10 is a diagram illustrating the reduction Moiré due to raster pinch in a scanned beam display in accordance with one or more embodiments.
Figure 10:
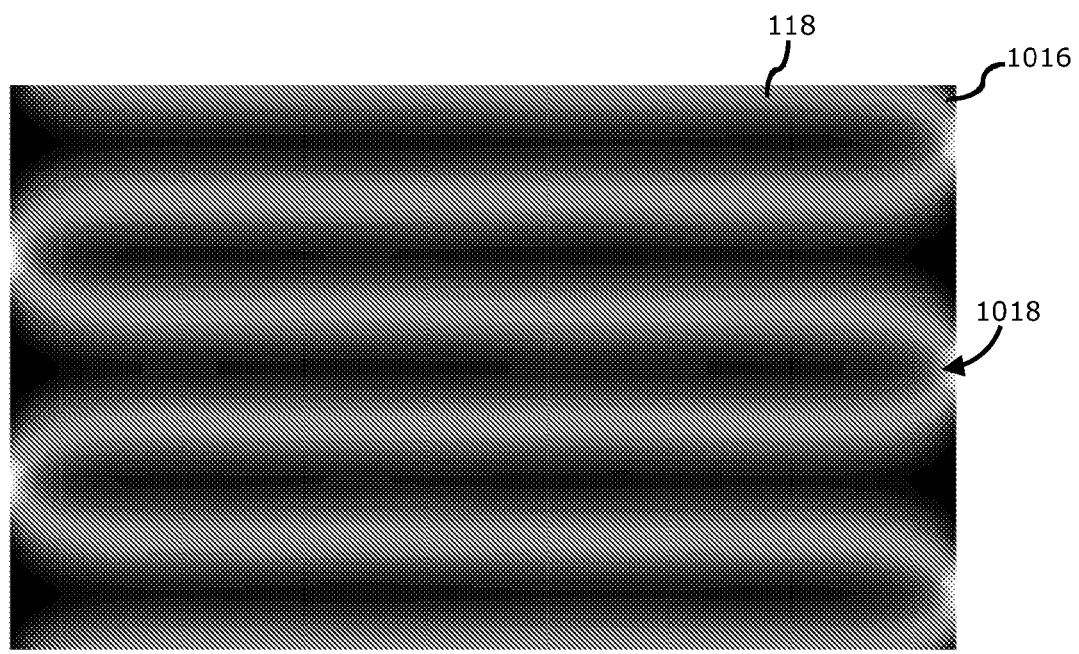

Referring now to FIG. 10, a diagram illustrating the reduction Moiré due to raster pinch in a scanned beam display in accordance with one or more embodiments will be discussed. In one or more embodiments, the Moiré brought on by raster pinch error may be dealt with by using a higher addressability than the ideal A=2 for the case of the raster being ideally spaced, that is having pinch correction. A typical raster scan 118 is shown in diagram 1010 where raster scan 118 appears as a generally sinusoidal form as MEMS scanner 116 reflects laser beam 114 across EPE 120 in a generally horizontal line scan in the X direction, while causing the reflected laser beam to also simultaneously gradually reflect laser beam 114 in the Y direction. Such a form for raster scan 118 may result in a generally uniform intensity distribution along the vertical in the active scan region in the center 1012 of raster pattern 118. However, the sinusoidal characteristic of raster scan 118 results in the pinch of line spacing near the edge 1014 of the active scan region, the raster pinch being due to the sinusoidal convergence of two adjacent scan lines. For the case of a scanned beam display equipped with raster pinch correction as shown in diagram 1016 where rather than being sinusoidal and therefore convergent, adjacent scan lines of raster scan 118 are generally parallel and are generally elliptical or circular at the ends where the direction of raster scan 118, the required addressability for the Gaussian beam at F=2 with T=0.85 case can be as low as A=2. While scanned beam displays having raster pinch error can typically show Moiré when used with an addressability of A=2, such Moiré brought on by raster pinch may be reduced by utilizing higher addressability of MEMS scanner 116. In addition, defocusing of the spot waist of laser beam may also be utilized to reduce Moiré caused by the raster pinch effect, for example by using slight beam defocusing in beam shaping optics 112, however with defocusing there may be a tradeoff with the modulation transfer function (MTF), thus in one or more embodiments raster ripple may be reduced or corrected via higher addressability of MEMS scanner 116, and the scope of the claimed subject matter is not limited in this respect.

As discussed above, in one or more embodiments Moiré artifacts may be sufficiently reduced if a Gaussian beam profile is utilized by minimizing raster ripple in the near field 134 wherein the beam spot size may be set relative to raster line spacing such that all, or nearly all, exit angles emanating from a lenslet 312 of EPE 120 are generally evenly filled by beam energy over a single scan frame, and by minimizing non-uniformity of overlaid beamlet profiles across eyebox 126 in the far field 136. Minimizing raster ripple places constraints on addressability for a given spot size, while minimizing non-uniformity places constraints on the beam profile and size relative to EPE pitch. If raster ripple is not sufficiently minimized then Moiré can be expected to occur, whereas if uniformity is not met simultaneously, apparent tiling can be expected to appear. In one or more embodiments, raster ripple may be minimized via utilization of extra addressability in MEMS scanner 116 which may be achieved for a given FOV formed by a relay such that an EPE 120 can be designed for 60 pixel-per-degree (ppd) angular resolution up to about a 96.2 ppd angular resolution where uniformity of the tiling may begin to suffer due to clipping at MEMS scanner 116 due to limited D on MEMS scanner 116. Where scanned beam display 100 comprises a head-up display, extra θD of MEMS scanner 116 may be utilized to achieve the desired effect. Furthermore, sharpness of the displayed image may be increased for the case of a Fill factor of F=2 over a Fill factor of F=1 due to the smaller spot size being produced. Human Factors testing indicated that the F=2 case with a 60 ppd EPE 120 appeared sharper in some respects as compared to a 92.6 ppd EPE with F=1 case. As a result. Apparently, not all of the extra θD of MEMS scanner 116 is lost in creating higher uniformity such that some portion of the extra θD may contribute to a higher image quality.

Figure 11:
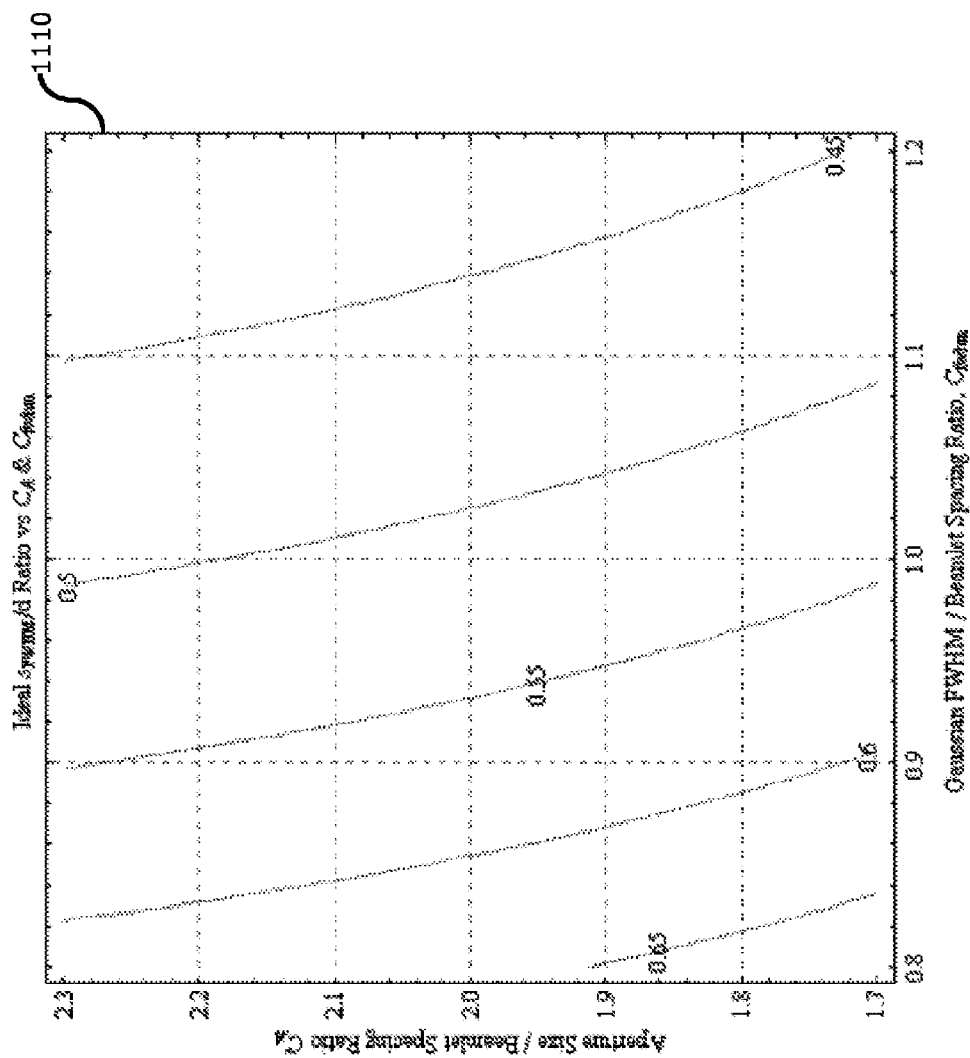
FIG. 11 is a graph of calculated spot size-to-pitch ratio for a Gaussian beam profile or the like in accordance with one or more embodiments.

Referring now to FIG. 11, a graph of calculated spot size-to-pitch ratio for a Gaussian beam profile or the like in accordance with one or more embodiments will be discussed. As shown in FIG. 11, graph 1110 illustrates the ratio of aperture size to beamlet spacing on the vertical axes, and the ration Gaussian full-width at half maximum spot size to beamlet spacing on the horizontal axis. Plot 1110 shows that for an aperture size of F=2 and for a Gaussian beam profile FWHM of F=1, the resulting spot size is approximately one-half the EPE pitch, or about 0.51 d. Since plot 1110 of FIG. 11 has the same axes as plot 500 of FIG. 5, the two plots may be considered together when selecting a suitable spot size. For example, if a design criterion were to maintain a Michelson contrast value of 0.08 or less, plot 500 could be overlaid with plot 1110 and any value for the spot size with respect to EPE pitch could be selected. In one example, a point on the curve where the spot size to EPE pitch is 0.45 could be selected so long as it falls within the Michelson contrast value of 0.08 on plot 500. As can be seen in plot 500, the area 516 in which the Michelson contrast ratio is within 0.08 opens up in the upper right hand portion of plot 500, which would appear to give wider latitude in the selection of spot size, aperture size, and beam profile FWHM. However, in this region of plot 500, additional addressability may be required at the expense of image resolution. Therefore, it may be more suitable to select a curve from plot 1110 that lies within the Michelson contrast value of 0.08 or less design space and that is more near to an ideal aperture size F=2 and Gaussian FWHM=1 to obtain suitable uniformity in the image with a lesser amount of addressability required to obtain the uniformity. However, this is merely one example of how a spot size may be selected to obtain reduced image non-uniformity using a Gaussian beam profile, and the scope of the claimed subject matter is not limited in this respect.

Although the claimed subject matter has been described with a certain degree of particularity, it should be recognized that elements thereof may be altered by persons skilled in the art without departing from the spirit and/or scope of claimed subject matter. It is believed that the subject matter pertaining to moiré reduction and minimizing coherent tiling artifacts for a scanned beam display having a Gaussian beam profile or the like and/or many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. A method, comprising:
emitting a beam having a non-top hat beam profile;
scanning the beam in a raster scan across an exit pupil expander to project an image to be displayed in an eyebox, the exit pupil expander comprising an array of cells, one or more of the cells having a transmission function; and
generating a diffraction envelope from two or more spot profiles resulting from a scan line of the raster scan in the cells of the array of cells;
wherein a time averaged diffraction envelope is generated in the eyebox from the diffraction envelope from the two or more spots to reduce Moiré in the projected image.

2. A method as claimed in claim 1, further said emitting further comprising generally matching a cross section of the laser beam to a shape of the cells.

3. A method as claimed in claim 1, wherein said emitting comprises providing a selected beam profile and said scanning comprising scanning the beam in a raster scan having a selected line spacing relative to spacing of the cells in the exit pupil expander in a near field region to evenly, or nearly evenly, spread the beam energy across the eyebox in a far field region.

4. A scanned beam display, comprising:
a laser source capable of emitting a beam having a non-top hat beam profile;
an exit pupil expander comprising an array of cells, one or more of the cells having a transmission function; and
a scanning mirror capable of scanning the beam in a raster scan across the exit pupil expander to project an image to be displayed in an eyebox; and
wherein the laser source in conjunction with the scanning mirror are capable of generating a diffraction envelope from two or more spot profiles resulting from a scan line of the raster scan in the cells of the array of cells, wherein a time averaged diffraction envelope is generated in the eyebox from the diffraction envelope from the two or more spot profiles to reduce Moiré in the projected image.

5. A scanned beam display as claimed in claim 4, wherein the laser source emits a beam having a cross section generally matched to a shape of the cells.

6. A scanned beam display as claimed in claim 4, wherein the laser source emits a beam having a selected beam profile and the scanning mirror scans the beam in a raster scan having a selected line spacing relative to spacing of the cells in the exit pupil expander in a near field region to evenly, or nearly evenly, spread energy of the beam across the eyebox in a far field region.

7. A scanned beam display as claimed in claim 4, wherein the cells of the exit pupil expander are generally hexagonal in shape.

8. A scanned beam display as claimed in claim 4, wherein the scanning mirror comprises a MEMS based scanner.

9. An apparatus, comprising:
a light source capable of emitting a beam having a non-top hat beam profile; and
a scanner capable of scanning the beam in a raster scan across an exit pupil expander to project an image to be displayed, the exit pupil expander comprising an array of cells, one or more of the cells having a transmission function;
wherein the light source in conjunction with the scanner are capable of generating a diffraction envelope from two or more spot profiles resulting from scan lines of the raster scan in a cell of the exit pupil expander, wherein a time averaged diffraction envelope is generated from the diffraction envelope from the two or more spot profiles to reduce Moiré in the projected image.

10. An apparatus as claimed in claim 9, wherein the light source is configured to emit a beam having a cross section generally matched to a shape of the cells of the exit pupil expander.

11. An apparatus as claimed in claim 9, wherein the light source is configured to emit a beam having a selected beam profile and the scanner scans the beam in a raster scan having a selected line spacing relative to spacing of the cells in the exit pupil expander in a near field region to evenly, or nearly evenly, spread energy of the beam across projected image in a far field region.

12. An apparatus as claimed in claim 9, wherein the cells of the exit pupil expander are generally hexagonal in shape.

13. An apparatus as claimed in claim 9, wherein the scanner comprises a MEMS based scanner.

* * * * *